(12) United States Patent
Kubota et al.

(10) Patent No.: US 6,401,022 B2
(45) Date of Patent: Jun. 4, 2002

(54) VEHICLE DRIVE POWER CONTROL APPARATUS, AND CONTROL METHOD

(75) Inventors: Hirofumi Kubota, Mishima; Zenichiro Mashiki, Nisshin; Isao Takagi, Okazaki; Hiroya Tanaka, Nishikamo-gun; Shinichi Mitani, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/861,620

(22) Filed: May 22, 2001

(30) Foreign Application Priority Data

May 23, 2000 (JP) .......................... 2000-151602

(51) Int. Cl.$^7$ .................. B60K 41/12; F02D 29/00; F16H 61/02
(52) U.S. Cl. ..................... 701/54; 701/61; 701/103; 477/43
(58) Field of Search .................. 701/54, 55, 56, 701/61, 87, 90, 101, 103, 104; 477/43, 48

(56) References Cited

U.S. PATENT DOCUMENTS 4,539,643 A * 9/1985 Suzuki et al. ............... 701/112
5,850,815 A * 12/1998 Yano et al. ................. 123/417

FOREIGN PATENT DOCUMENTS

| JP | A 10-329587 | 12/1998 |
| JP | A 11-198684 | 7/1999 |

\* cited by examiner

Primary Examiner—Tan Nguyen
(74) Attorney, Agent, or Firm—Oliff & Berridge, PLC

(57) ABSTRACT

A vehicle drive power control apparatus and method control the speed ratio of a transmission based on a speed shift line that is set so that, within a practical region, the speed shift line is in a low revolution speed side of an optimal fuel consumption line determined based on the efficiency of the engine and the efficiency of the transmission. Therefore, the width of increase in revolution speed from the speed occurring at the beginning of the practical region is curbed. Hence, the fuel consumption resulting from inertia torques caused by fluctuations in engine revolution speed, that is, fluctuations in the revolution speed of the input shaft of the transmission and a fluidic power transfer mechanism, is reduced, so that the efficiency as a whole increases and the fuel economy improves in comparison with the case where the optimal fuel consumption line is used as a control basis.

19 Claims, 19 Drawing Sheets

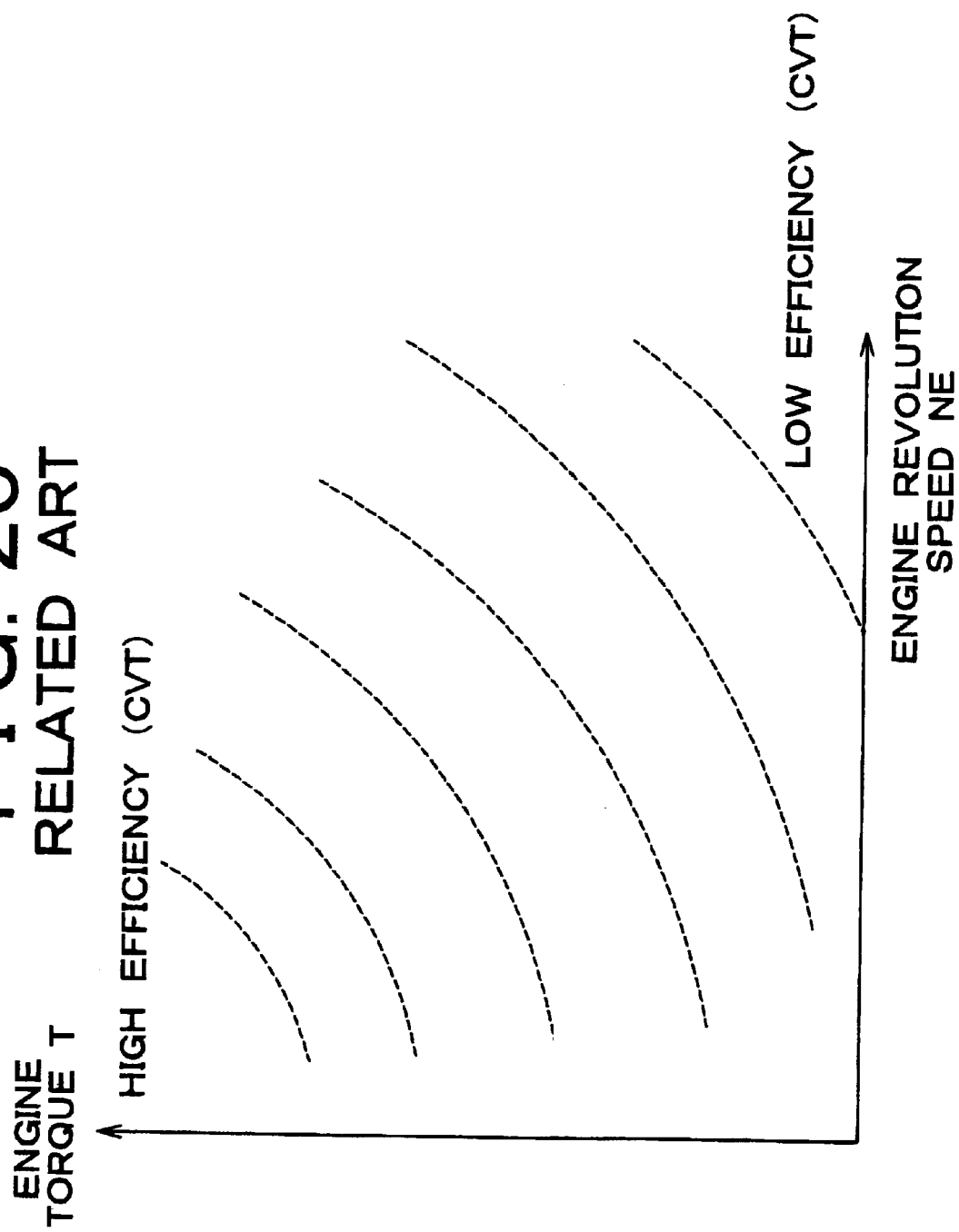

VEHICLE DRIVE POWER CONTROL APPARATUS, AND CONTROL METHOD

INCORPORATION BY REFERENCE

The disclosure of Japanese Patent Application No. 2000-151602 filed on May 23, 2000 including the specification, drawings and abstract is incorporated herein by reference in its entirety.

BACKGROUND OF THE INVENTION

1. Field of Invention

The present invention relates to a vehicle drive power control apparatus which determines a target drive power based on a state of operation of a vehicle driven by output of an internal combustion engine via a continuously variable transmission, and which controls the torque of the engine and the speed ratio of the continuously variable transmission so as to obtain an output of the engine for achieving the target drive power. The invention also relates to a control method of the apparatus.

2. Description of Related Art

As apparatuses for controlling the drive power of a vehicle so as to achieve good fuel economy, apparatuses of generally termed coordinate control performed through the use of a continuously variable transmission are known (Japanese Patent Application Laid-Open No. 11-198684 and No. 10-329587). This coordinate control determines a target drive power based on the state of operation of the vehicle, and coordinately controls the torque of the internal combustion engine and the speed ratio of the continuously variable transmission so as to obtain the engine output that achieves the determined target drive power with a minimum fuel consumption rate. Through the coordinate control, the fuel economy is improved.

In such a drive power control apparatus, speed shift lines of the continuously variable transmission are set so as to conform to optimal fuel economy lines (FIG. 19) based on the efficiency of the internal combustion engine, or to optimal fuel economy lines (comparative examples indicated by one-dot chain lines in FIGS. 12 and 15) determined with the efficiency of the internal combustion engine and the efficiency of the continuously variable transmission (FIG. 20) taken into consideration.

However, in the vehicles equipped with the above-described drive power control apparatus, the fuel economy has not been sufficiently improved in a practical region. A reason for the insufficient improvement is as follows. Based on the speed shift lines set so as to conform to optimal fuel economy lines as described above, the running of the vehicle in a practical region involves a fuel consumption increase corresponding to the inertia torques caused by fluctuated rotations of an input shaft of the continuously variable transmission, so that a low efficiency results as a whole.

SUMMARY OF THE INVENTION

It is an object of the invention to provide a vehicle drive power control apparatus capable of improving fuel economy by reducing the fuel consumption caused by the aforementioned inertia torque and thereby enhancing the efficiency as a whole, and a control method of the apparatus.

In accordance with a first mode of the invention, a drive power control apparatus of a vehicle that is driven by the output of an engine via a transmission determines a target drive power based on a state of operation of the vehicle, and controls the torque of the engine and the speed ratio of the transmission so as to provide an output of the engine for achieving the target drive power. The control apparatus controls the speed ratio of the transmission based on a speed shift line that is plotted on a graph having a pair of axis defining the revolution speed of the engine and the torque of the engine so that, within a practical region, the speed shift line is at a low revolution speed side of an optimal fuel consumption line that is determined based on at least the efficiency of the engine and the efficiency of the transmission, of the efficiency of a drive system that includes the engine and the transmission.

The speed ratio of the transmission is controlled in accordance with the speed shift line that is set so that, within the practical region, the speed shift line is located on the low revolution speed side of the optimal fuel consumption line determined based on the efficiencies of the engine and the transmission of the drive system. Thus, the speed shift line is shifted to the low engine speed side within the practical region. Therefore, the width of increase in engine revolution speed from the level occurring at the beginning of the practical region is curbed. Hence, the fuel consumption resulting from inertia torques caused by fluctuations in the engine revolution speed, that is, fluctuations in the revolution speed of the input shaft of the transmission, is reduced, so that the efficiency as a whole increases and the fuel economy improves in comparison with the case where the optimal fuel consumption line is used as a control basis.

The speed shift line may be set so that, within the practical region, a difference between a minimum revolution speed and a maximum revolution speed on the speed shift line is smaller than a difference between a minimum revolution speed and a maximum revolution speed on the optimal fuel consumption line. Furthermore, the speed shift line may be set so that, within the practical region, a sensitivity of a fluctuation in the revolution speed with respect to a fluctuation in the target drive power on the speed shift line is lower than a sensitivity of a fluctuation in the revolution speed with respect to the fluctuation in the target drive power on the optimal fuel consumption line.

The aforementioned construction prevents great fluctuations in the revolution speed of the engine even if the output of the engine fluctuates in accordance with the target drive power within the practical region. Therefore, the fuel consumption resulting from inertia torques caused by fluctuations in the engine revolution speed, that is, fluctuations in the revolution speed of the input shaft of the transmission, is reduced, so that the efficiency as a whole increases and the fuel economy improves in comparison with the case where the optimal fuel consumption line is used as a control basis.

The drive power control apparatus may further have a construction wherein the engine comprises a NOx storage-reduction type catalyst in an exhaust system, and during the lean combustion, the engine reduces NOx stored in the NOx storage-reduction type catalyst by performing a rich spike control of temporarily changing an air-fuel mixture so that a fuel concentration in the mixture becomes higher than the fuel concentration corresponding to a stoichiometric air-fuel ratio, and wherein on a boundary line between the lean combustion and the stoichiometric air-fuel ratio combustion in the two-dimensional space of the revolution speed of the engine and the torque of the engine, the speed shift line passes through or near a point at which a corrected fuel consumption rate determined by considering the rich spike control and a fuel consumption rate provided during the lean combustion becomes equal to or closest to a fuel consumption rate provided during the stoichiometric air-fuel ratio combustion.

If the selectable forms of combustion includes a stoichiometric air-fuel ratio combustion and a lean combustion and the rich spike control is performed during the lean combustion, the speed shift line is set so that the point which exists on the boundary line between the lean combustion and the stoichiometric air-fuel ratio combustion and through which the speed shift line passes coincides with or exists near the point at which the corrected fuel consumption rate determined by considering the rich spike control and the fuel consumption rate provided during the lean combustion becomes equal to or closest to the fuel consumption rate provided during the stoichiometric air-fuel ratio combustion. This makes it possible to maintain a state of good fuel consumption rate even when the form of combustion changes between the lean combustion and the stoichiometric air-fuel ratio combustion in accordance with the speed shift line. Thus, the changing between the forms of combustion is optimized, so that fuel economy can be further improved.

In a vehicle drive control method in accordance with another mode of the invention, a target output of the engine for achieving a target drive power set based on a state of operation of the vehicle is calculated. Furthermore, a target revolution speed of the engine is set based on a speed shift line that is plotted on a graph having a pair of axis defining a revolution speed of the engine and the target output of the engine so that, within a practical region in which the state of operation of the engine is practical, a width of increase in the revolution speed of the engine to a relatively high revolution speed on the speed shift line is curbed compared with an optimal fuel consumption line determined based on at least an efficiency of the engine and an efficiency of the transmission, of an efficiency of a drive system that includes the engine and the transmission. Then, the speed ratio of the transmission is controlled so that an actual revolution speed of the engine becomes equal to the target revolution speed.

According to this mode of the invention, the fuel consumption resulting from inertia torques caused by fluctuations in the engine revolution speed, that is, fluctuations in the revolution speed of the input shaft of the transmission, is reduced, so that the efficiency as a whole increases and the fuel economy improves in comparison with the case where the optimal fuel consumption line is used as a control basis.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein:

FIG. 20 is a diagram illustrating the efficiency of a continuously variable transmission.

DETAILED DESCRIPTION OF PREFERRED EMBODIMENTS

Figure 1:
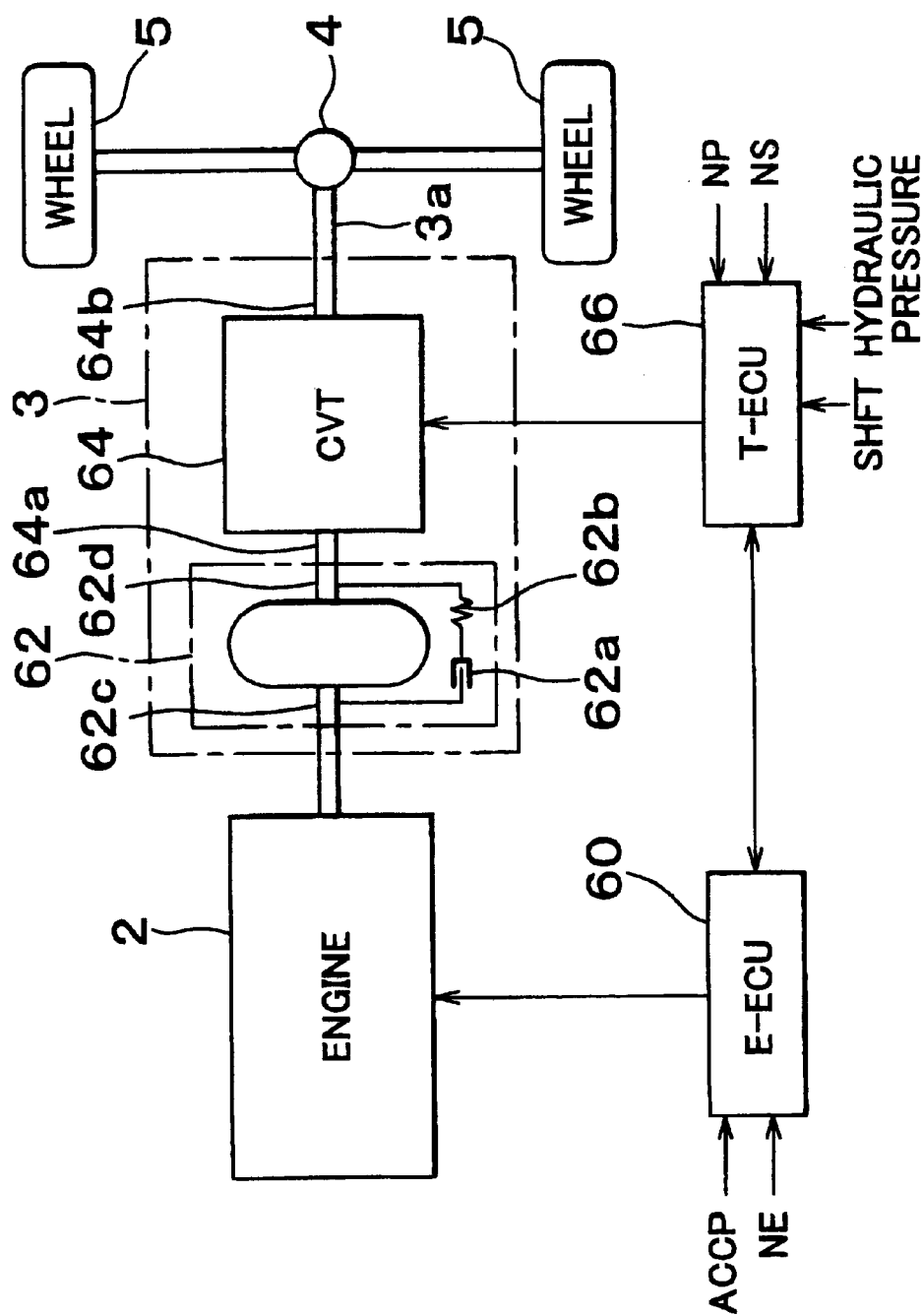
FIG. 1 is a schematic block diagram of a drive system and a control system of a motor vehicle in accordance with Embodiment 1.

FIG. 1 is a schematic block diagram of a drive system and a control system for a motor vehicle to which the invention is applied.

Figure 2:
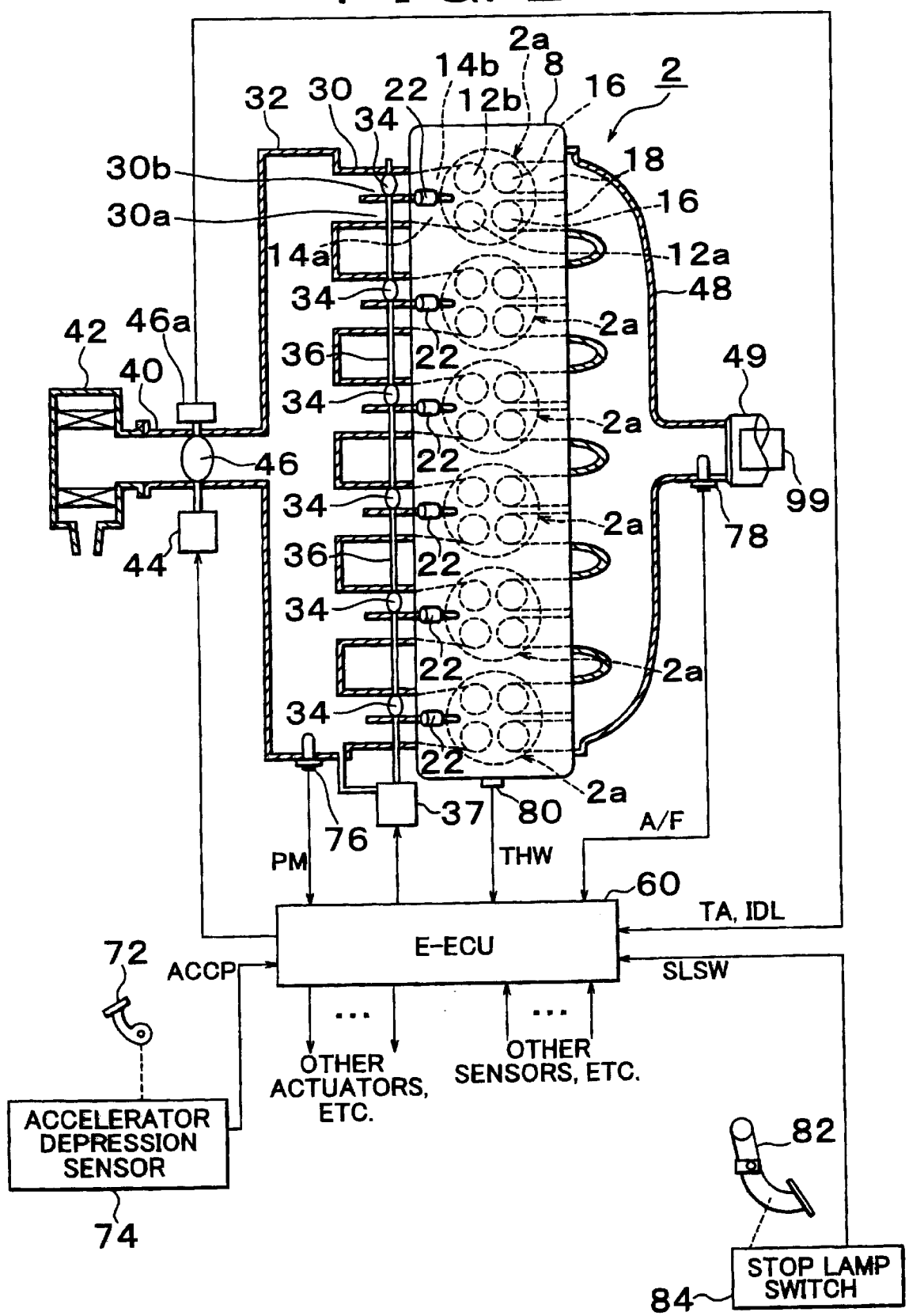
FIG. 2 is a schematic diagram illustrating a construction of an engine in accordance with Embodiment 1.

An engine 2 as a power source is connected to a transmission mechanism 3. An output shaft 3a of the transmission mechanism 3 is connected to right and left-side drive wheels 5 via a differential 4. FIG. 2 schematically shows a construction of the engine 2. The engine 2 is a direct injection type gasoline engine that is installed as a vehicle-driving engine in a motor vehicle. The engine 2 has six cylinders 2a. As shown in FIGS. 3 to 6, each cylinder 2a has a combustion chamber 10 that is defined by a cylinder block 6, a piston 7 disposed for reciprocating movements within the cylinder block 6, and a cylinder head 8 mounted on the cylinder block 6.

Each combustion chamber 10 is provided with a first intake valve 12a, a second intake valve 12b, and a pair of exhaust valves 16. The first intake valve 12a is connected to a first intake port 14a. The second intake valve 12b is connected to a second intake port 14b. The two exhaust valves 16 are connected to two exhaust ports 18, respectively.

Figure 3:
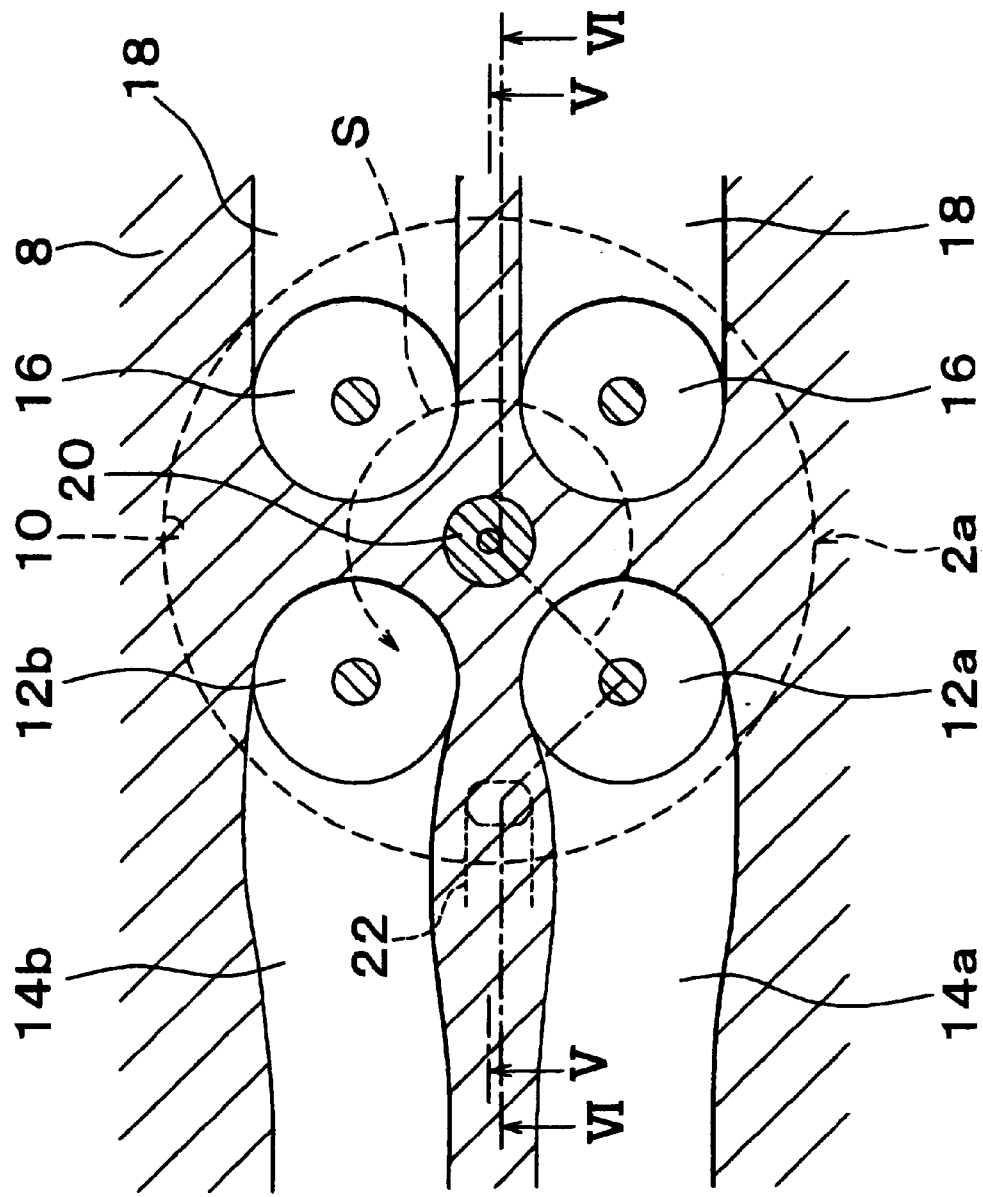
FIG. 3 is a horizontal sectional view of a cylinder head in the engine in Embodiment 1.

FIG. 3 is a horizontal sectional view of a portion of the cylinder head 8 corresponding to one of the cylinders. As shown in FIG. 3, the first intake port 14a and the second intake port 14b of each cylinder are straight intake ports that extend substantially linearly. An ignition plug 20 is disposed in a central portion of an inner wall surface of the cylinder head 8. A fuel injection valve 22 is disposed in a peripheral portion of an inner wall surface of the cylinder head 8 that is adjacent to both the first intake valve 12a and the second intake valve 12b. Each fuel injection valve 22 is disposed so that fuel can be injected therefrom directly into the combustion chamber 10.

Figure 4:
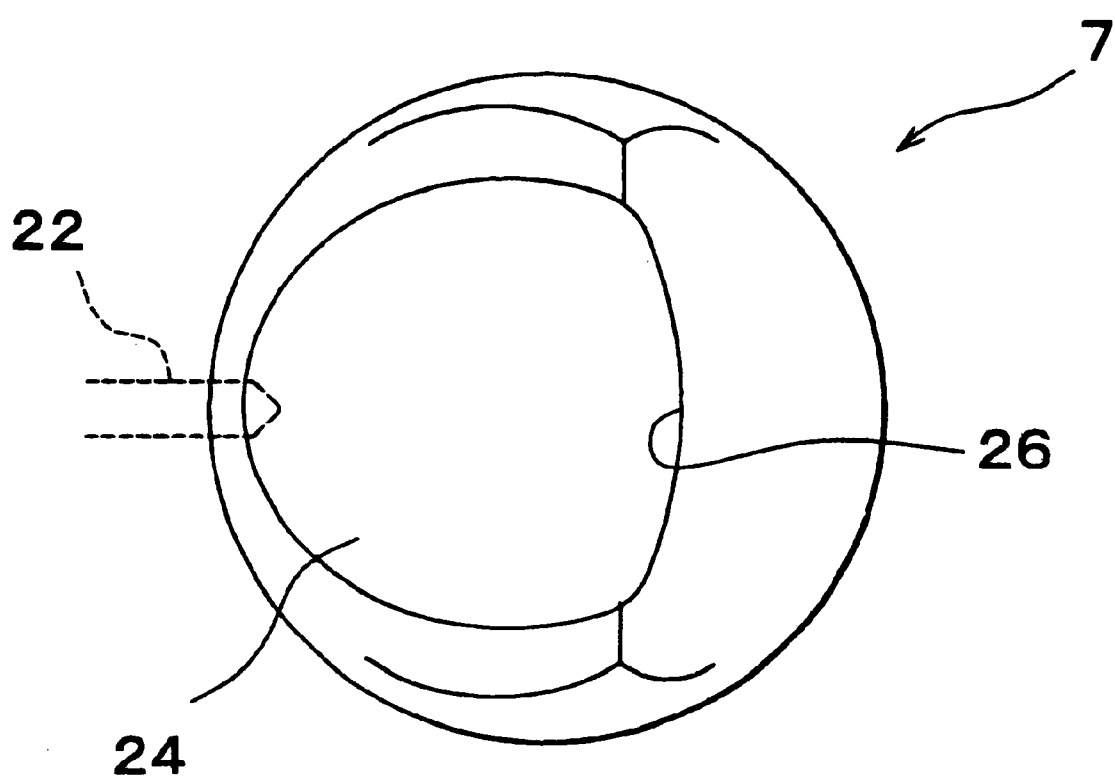
FIG. 4 is a plan view of a top surface of a piston in the engine in Embodiment 1.
Figure 5:
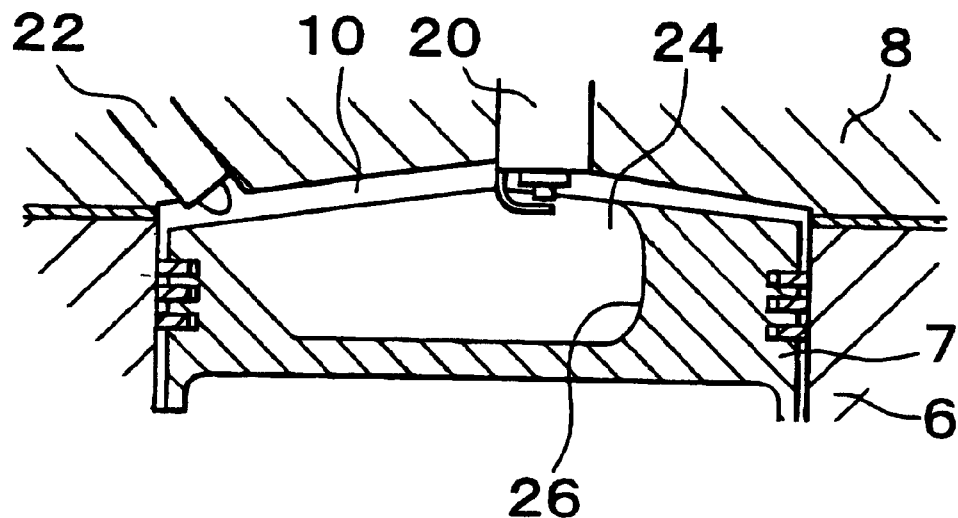
FIG. 5 is a section taken on line V—V in FIG. 3.
Figure 6:
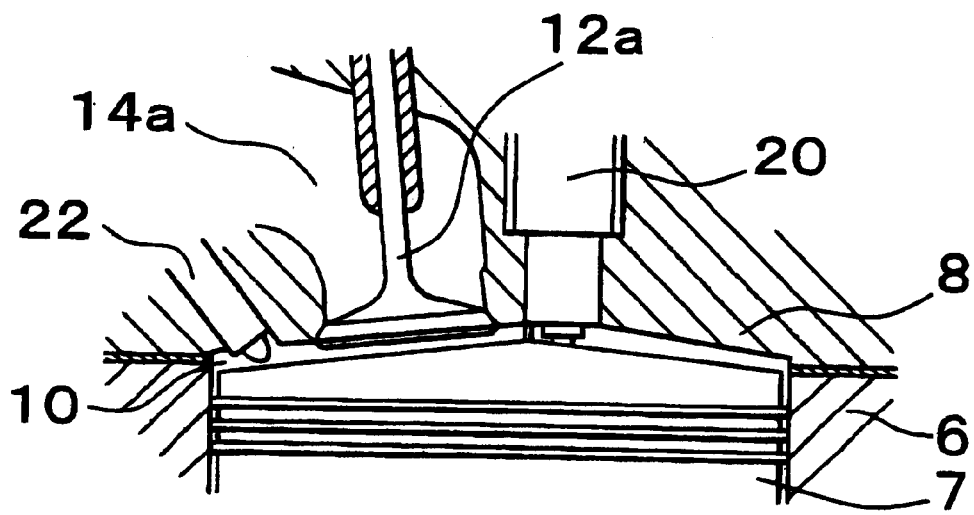
FIG. 6 is a section taken on line VI—VI in FIG. 3.

FIG. 4 is a plan view of a stop surface of one of the pistons 7. FIG. 5 is a section taken on line V—V in FIG. 3. FIG. 6 is a section taken on line VI—VI in FIG. 3. As shown in the drawings, a generally ridge-shaped top face of the piston 7 has a recess 24 having an inverted dome-like contour which extends from a site below the fuel injection valve 22 to a site below the ignition plug 20.

As shown in FIG. 2, the first intake ports 14a of the cylinders 2a are connected to a surge tank 32 via first intake passages 30a formed in an intake manifold 30. The second intake ports 14b are connected to the surge tank 32 via second intake passages 30b. An airflow control valve 34 is disposed within each second intake passage 30b. The airflow control valves 34 are interconnected via a common shaft 36, and are opened and closed via the shaft 36 by a negative pressure actuator 37. When the airflow control valves 34 are closed, intake air is introduced via only the first intake ports 14a, and form strong swirls S (FIG. 3) within the combustion chambers 10.

The surge tank 32 is connected to an air cleaner 42 via an intake duct 40. A throttle valve 46 driven by an electric motor 44 (a DC motor or a stepping motor) is disposed in the intake duct 40. The degree of opening of the throttle valve 46 (degree of throttle opening TA) and the completely closed state of the throttle valve 46 (complete closure signal IDL) are detected by a throttle opening sensor 46a. The degree of opening of the throttle valve 46 is controlled in accordance with the state of operation. The exhaust ports 18 of the cylinders 2a are connected to an exhaust manifold 48. The exhaust manifold 48 discharges exhaust gas, via a catalytic converter 49 that controls the emission.

Referring back to FIG. 1, the above-described engine 2 is electrically controlled by an engine-controlling electronic control unit (hereinafter, referred to as "E-ECU") 60 that is mainly formed by a microcomputer. As described below, the E-ECU 60 receives inputs of signals and detected values corresponding to the engine revolution speed NE, the accelerator operation amount ACCP, etc., so as to control the engine 2.

The transmission mechanism 3 has a fluidic power transfer mechanism 62 and a continuously variable transmission (hereinafter, referred to as "CVT") 64. The fluidic power transfer mechanism 62 is a mechanism that transfers torque between the side of an input shaft 62c and the side of an output shaft 62d via a fluid such as an oil or the like. In this embodiment, the fluidic power transfer mechanism 62 is a torque converter. The fluidic power transfer mechanism 62 has a lockup mechanism 62a. The lockup mechanism 62a is a clutch mechanism that directly interlocks the input shaft 62c side and the output shaft 62d side via a mechanical means such as a friction plate or the like. The lockup mechanism 62a has, for a buffering purpose, a damper 62b that is formed by an elastic body such as coil spring or the like.

The input shaft 62c of the fluidic power transfer mechanism 62 is connected to a crankshaft of the engine 2. The output shaft 62d of the fluidic power transfer mechanism 62 is connected to an input shaft 64a of the CVT 64. The CVT 64 is a transmission mechanism capable of steplessly (continuously) varying the ratio between the rotation speed of the input shaft 64a and the rotation speed of an output shaft 64b, that is, the speed ratio. In this embodiment, the CVT 64 is a belt type continuously variable transmission. The CVT 64 incorporates a gear transmission mechanism for accomplishing a reverse drive function, and may further incorporate a gear transmission mechanism for expanding the width of speed ratio if necessary.

A control of the changing between engagement (locked-up state) and disengagement (unlocked state) of the lockup mechanism 62a of the transmission mechanism 3, and a control of the speed ratio of the CVT 64 are performed by a transmission mechanism-controlling electronic control unit (hereinafter, referred to as "T-ECU") 66 in accordance with the state of running of the vehicle.

The T-ECU 66 is connected to the E-ECU 60 in a data transmission capable manner, and receives inputs of signals and detected values corresponding to the hydraulic pressure for driving the lockup mechanism 62a, the rotation speeds NP, NS of pulleys of the CVT 64, etc., as data for control. The T-ECU 66 also receives inputs of shift signals for selecting one of states of the CVT 64, that is, a stopped state (parking P), a reverse drive state (reverse R), a neutral state (neutral N), an automatic transmission mode (drive D) that is an automatic forward drive state in which the speed ratio is automatically set in accordance with the state of running of the vehicle, and a manual transmission mode (manual M) that is a manual sate in which the transmission state is manually set.

Figure 7:
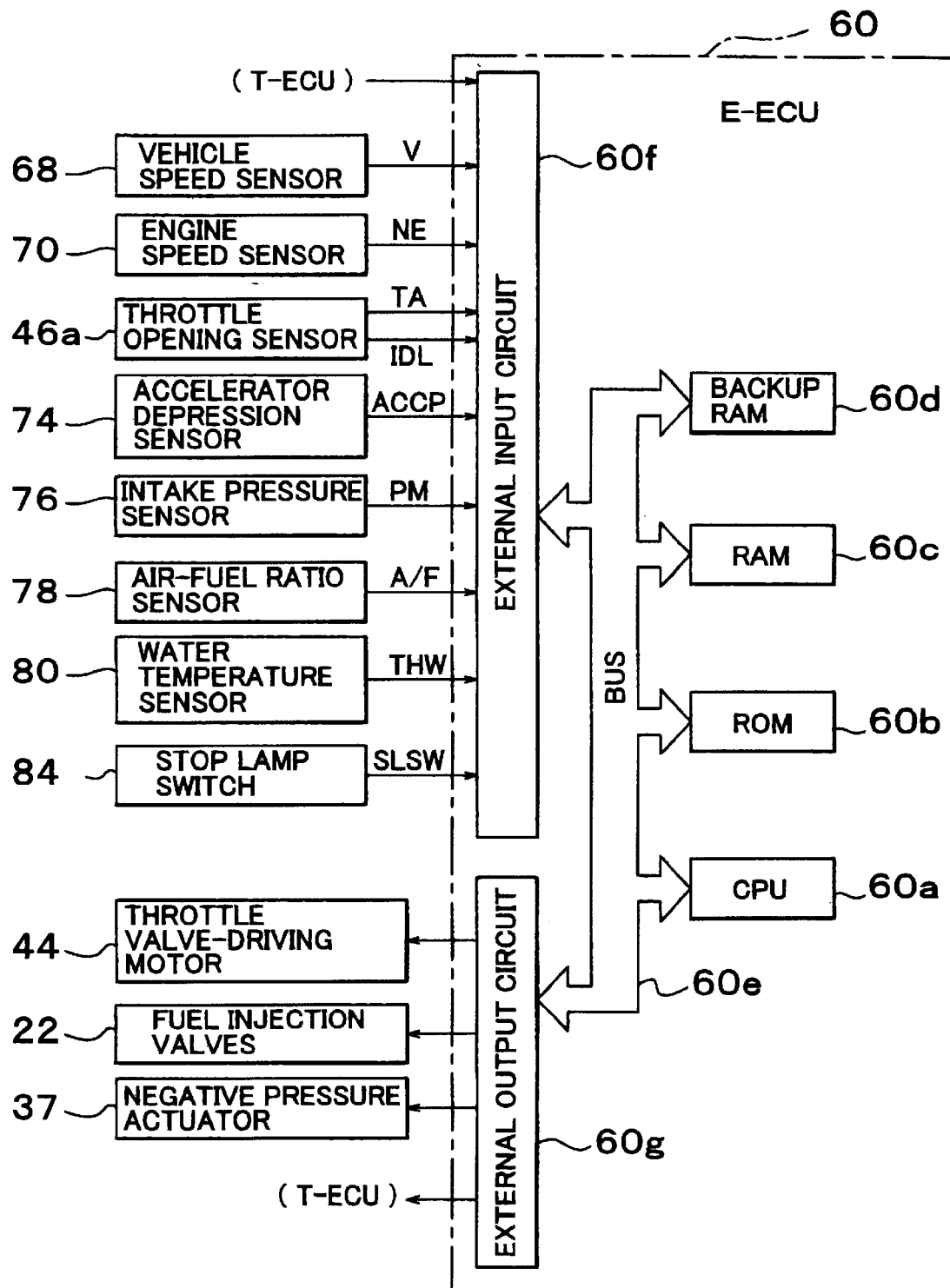
FIG. 7 is a block diagram illustrating a construction of an E-ECU in Embodiment 1.

A construction of the E-ECU 60 is illustrated in the block diagram of FIG. 7. The E-ECU 60 is a control unit for controlling the engine 2, for example, performing a throttle opening degree control, a fuel injection control, an ignition timing control, an idle speed control, etc. The E-ECU 60 is formed as a logic circuit having a CPU 60a, a ROM 60b, a RAM 60c, a backup RAM 60d, etc. The ROM 60b is a memory that pre-stores various control programs, data, such as map or the like, for reference during execution of the various programs. Based on the various programs and data stored in the ROM 60b, the CPU 60a executes various operations. The RAM 60c is a memory for temporarily storing results of operations of the CPU 60a, data or the like obtained from outputs of various sensors. The backup RAM 60d is a non-volatile memory for storing data that needs to be retained during stop of the engine 2. The CPU 60a, the ROM 60b, the RAM 60c and the backup RAM 60d are interconnected by a bus 60e, and are also connected to an external input circuit 60f and an external output circuit 60g via the bus 60e. The external input circuit 60f is connected to a vehicle speed sensor 68 for detecting the vehicle speed V, an engine speed sensor 70 for detecting the engine revolution speed NE, the throttle opening sensor 46a, an accelerator depression sensor 74 for detecting the accelerator operation amount ACCP, that is, the amount of depression of an accelerator pedal 72, an intake pressure senor 76 for detecting the intake pressure PM in the surge tank 32, an air-fuel ratio sensor 78 for detecting the air-fuel ratio A/F based on exhaust components, a water temperature sensor 80 for detecting the cooling water temperature THW of the engine 2, a stop lamp switch 84 for detecting whether a brake pedal 82 (FIG. 2) has been depressed, etc. The external output circuit 60g is connected to the throttle valve-driving motor 44, the fuel injection valve 22 of each cylinder of the engine 2, the negative pressure actuator 37, an igniter (not shown), and other actuators, which are driven when necessary.

Figure 8:
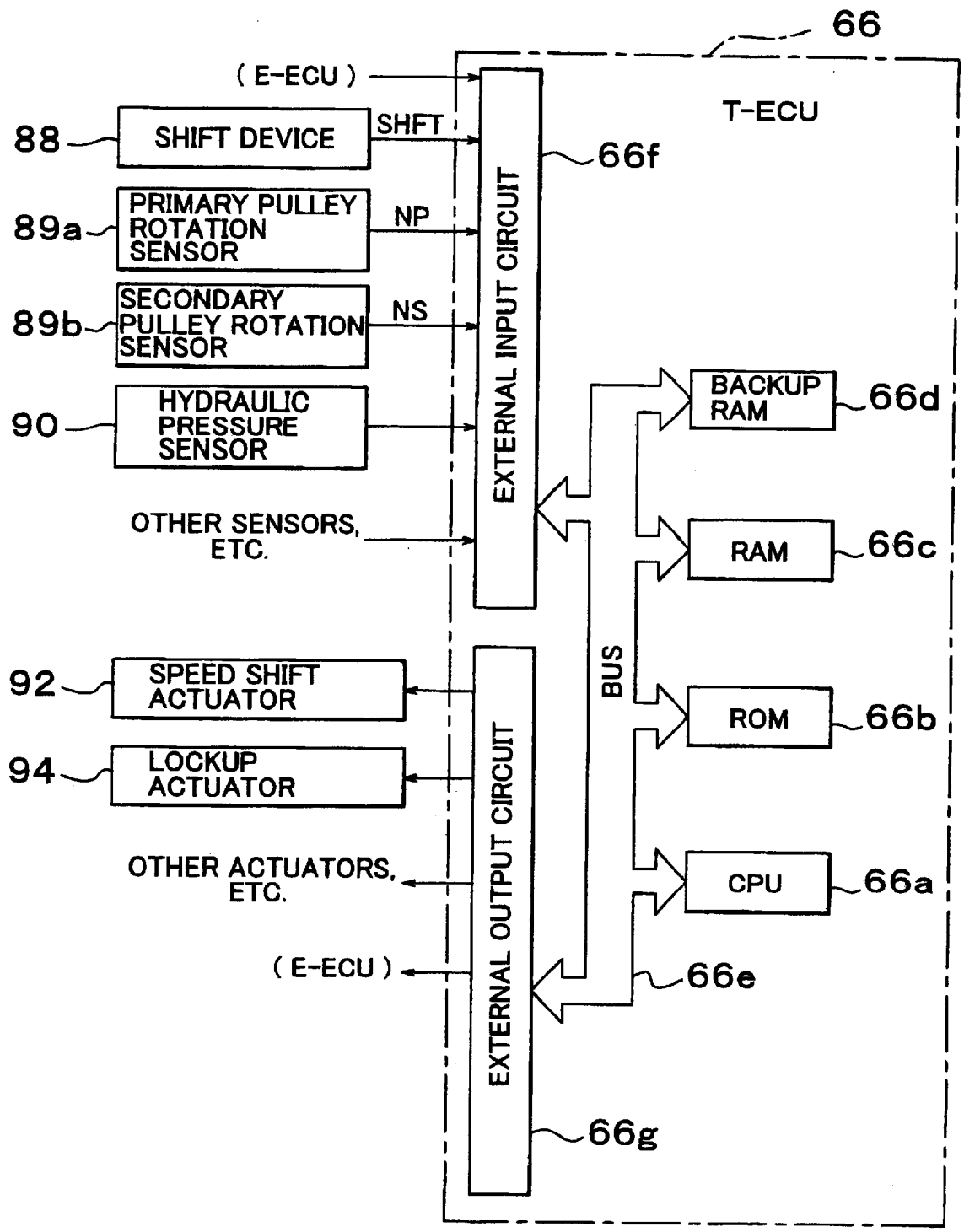
FIG. 8 is a block diagram illustrating a construction of an T-ECU in Embodiment 1.

A construction of the T-ECU 66 is shown in the block diagram of FIG. 8. The T-ECU 66 is a control unit that performs an automatic transmission operation by controlling the lockup mechanism 62a and the CVT 64. The T-ECU 66 is formed as a logic circuit having a CPU 66a, a ROM 66b, a RAM 66c, a backup RAM 66d, a bus 66e, an external input circuit 66f, an external output circuit 66g, etc. These components 66a to 66g perform basically the same functions as those in the E-ECU 60. The external input circuit 66f is connected to a shift device 88 that outputs the aforementioned shift signal SHFT, a primary pulley rotation sensor 89a for detecting the rotation speed NP of the primary pulley in the CVT 64, a secondary pulley rotation sensor 89b for detecting the rotation speed NS of the secondary pulley in the CVT 64, a hydraulic pressure sensor 90 for detecting the hydraulic pressure for driving the lockup mechanism 62a, and other sensors and the like. The external output circuit 66g is connected to a speed shift actuator 92 for changing the speed ratio by driving the primary pulley and the second pulley in the CVT 64, a lockup actuator 94 for switching the lockup mechanism 62a of the fluidic power transfer mechanism 62, and other actuators and the like. The T-ECU 66 is connected in terms of signals to the E-ECU 60 via the external input circuit 66f and the external output circuit 66g, for mutual communications with the E-ECU 60.

When the automatic transmission mode D is selected, the E-ECU 60 and the T-ECU 66 constructed as described above perform a coordinate control so as to generate an appropriate drive power on the drive wheels 5 in accordance with a drive power requested by an operating person via the accelerator pedal 72 or the like. More specifically, the E-ECU 60 adjusts one or more of the amount of intake air, the amount of fuel injection, and the form of combustion so as to provide the fuel economy and the engine output torque needed to achieve the requested drive power. The T-ECU 66 adjusts the speed ratio so as to achieve an engine revolution speed NE that is needed to achieve a requested drive power.

Figure 9:
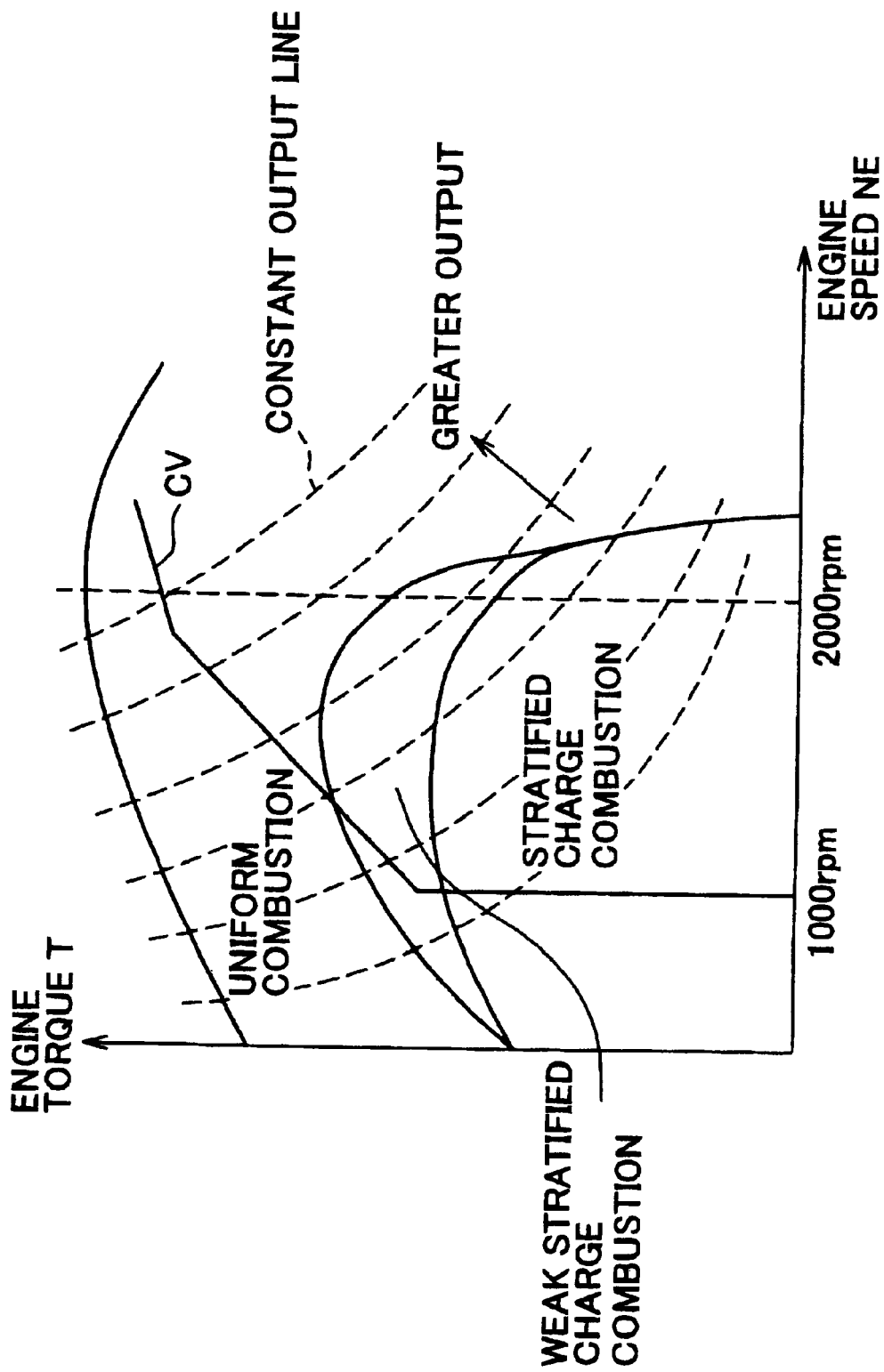
FIG. 9 illustrates a speed shift line CV that is used in Embodiment 1.

With regard to the form of combustion in Embodiment 1, one of a stratified charge combustion, a uniform combustion and a weak stratified charge combustion is selected in accordance with the state of operation. In the stratified charge combustion mode, fuel is injected into each combustion chamber 10 from the corresponding fuel injection valve 22 during a late period in the compression stroke so that a stratified mixture with high fuel concentration is formed, and is ignited. In the uniform combustion, fuel is injected into each combustion chamber 10 from the corresponding fuel injection valve 22 during the intake stroke so that a uniform mixture is formed, and is then ignited. In the weak stratified charge combustion, fuel is injected both during the intake stroke and during a late period in the compression stroke so that a stratified mixture is formed in a uniform and lean mixture, and is ignited. FIG. 9 indicates regions of the forms of combustion that are expressed in a two-dimensional space based on the engine revolution speed NE and the engine torque T. In FIG. 9, broken lines represent constant output lines, and a bent solid line represents a speed shift line CV used in Embodiment 1.

During the stratified charge combustion mode, injected fuel provided by injection performed during the late period of the compression stroke moves from the fuel injection valve 22 into the recess 24 of the piston 7 in each cylinder, and then strikes a peripheral wall surface 26 (see, e.g., FIGS. 4, 5). Upon striking the peripheral wall surface 26, fuel moves while vaporizing, and forms a combustible mixture layer in the recess 24 adjacent to the ignition plug 20. The stratified combustible mixture is ignited by the ignition plug 20, thereby accomplishing stratified charge combustion. In this manner, stable combustion can be accomplished in each combustion chamber 10 with intake air existing in an extremely excess amount relative to fuel.

During the uniform combustion, an amount of fuel corrected in various manners based on a stoichiometric air-fuel ratio basic fuel injection amount QBS is injected during the intake stroke. The injected fuel flows into each combustion chamber 10 together with inflowing intake air, and continues flowing until ignition. Therefore, a uniform mixture of the stoichiometric air-fuel ratio (in some cases, the air-fuel ratio is controlled to a rich air-fuel ratio that means a higher fuel concentration than the stoichiometric air-fuel ratio, due to an increasing correction) is formed in the entire combustion chamber 10, so that the uniform combustion is accomplished.

During the weak stratified charge combustion mode, fuel injected by the first injection flows into the combustion chamber 10 together with intake air, thereby forming a uniform lean mixture in the entire combustion chamber 10. Then, the second fuel injection performed at a late time in the compression stroke, so that a combustible mixture layer is formed within the recess 24 in the vicinity of the ignition plug 20 as mentioned above. The stratified combustible mixture is ignited by the ignition plug 20, and ignited flame burns the lean mixture existing in the entire combustion chamber 10. In this manner, stratified charge combustion with a weak degree of stratification is accomplished, so that a smooth torque change can be realized in an intermediate region between the stratified charge combustion and the uniform combustion.

Figure 10:
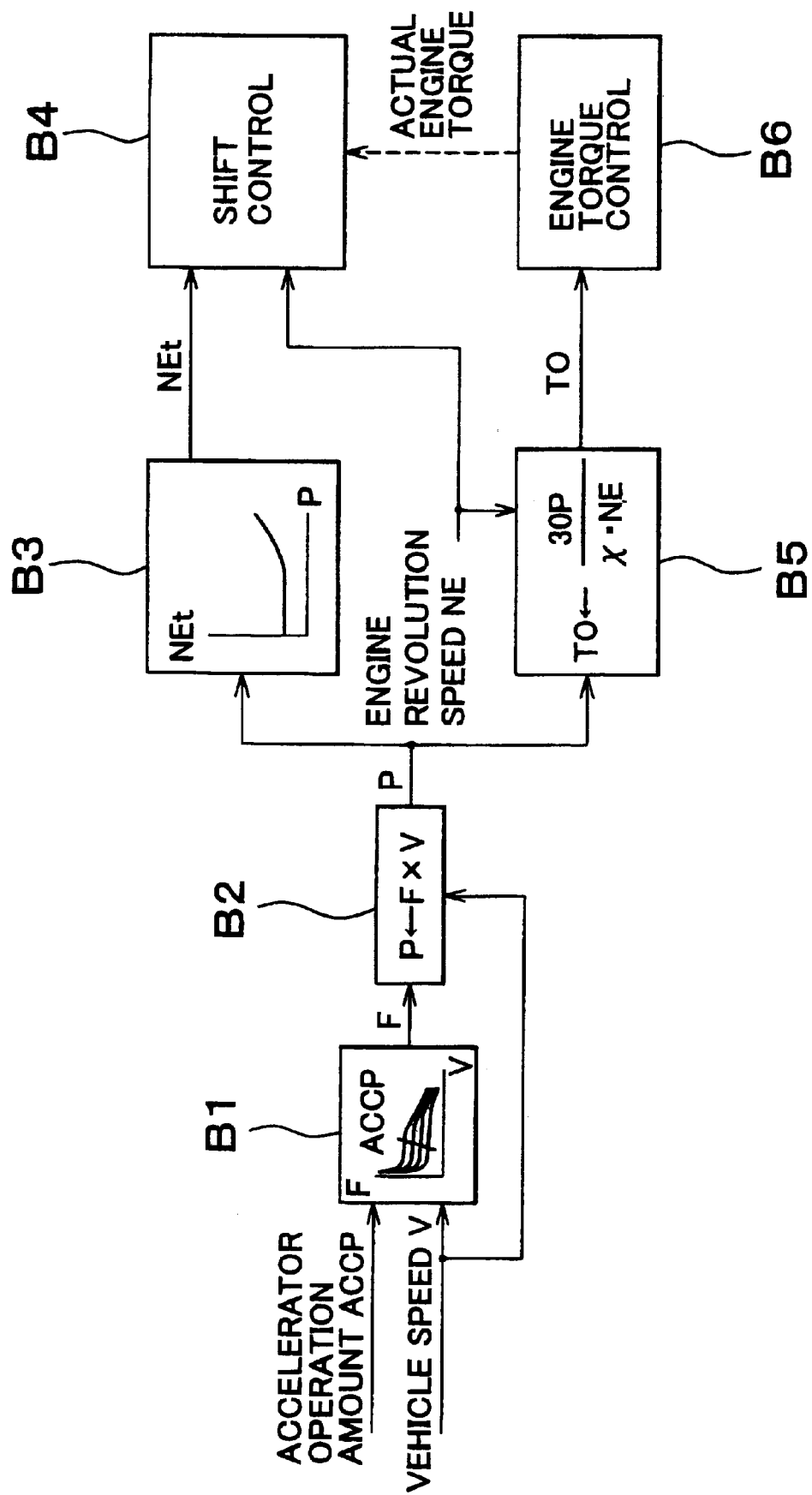
FIG. 10 is a control block diagram of a coordinate control portion performed by the E-ECU and the T-ECU in Embodiment 1.

The coordinate control performed when the automatic transmission mode D is selected will next be described in detail with reference to the control block diagram of FIG. 10. In the below description, B1 to B6 parenthesized represent blocks shown in FIG. 10. The blocks B3, B4 correspond to processes performed by the T-ECU 66. The other blocks correspond to processes performed by the E-ECU 60.

First, a target drive power F is set based on the accelerator operation amount ACCP and the vehicle speed V (B1). The vehicle speed V may be substituted with, for example, the rotation speed of a different rotating member that has a corresponding relation with the vehicle speed.

The setting of the target drive power F based on the accelerator operation amount ACCP and the vehicle speed V is performed based on a map prestored in the ROM 60b. More specifically, a relationship between the vehicle speed V and the target drive power F is pre-set as a map using the accelerator operation amount ACCP as a parameter. This map is used. In the setting of the map, the target drive power F is determined so as to reflect characteristics of the object vehicle or engine 2 or the like.

Next, based on the determined target drive power F and the vehicle speed V or a detected value corresponding to the vehicle speed, a target output P is calculated (B2). More specifically, the target output P can be calculated as a product of the target drive power F and the vehicle speed V as in Equation (1).

$$P \leftarrow F \times V \qquad (1)$$

The thus-calculated target output P is used to calculate a target engine revolution speed NEt (B3).

Figure 11:
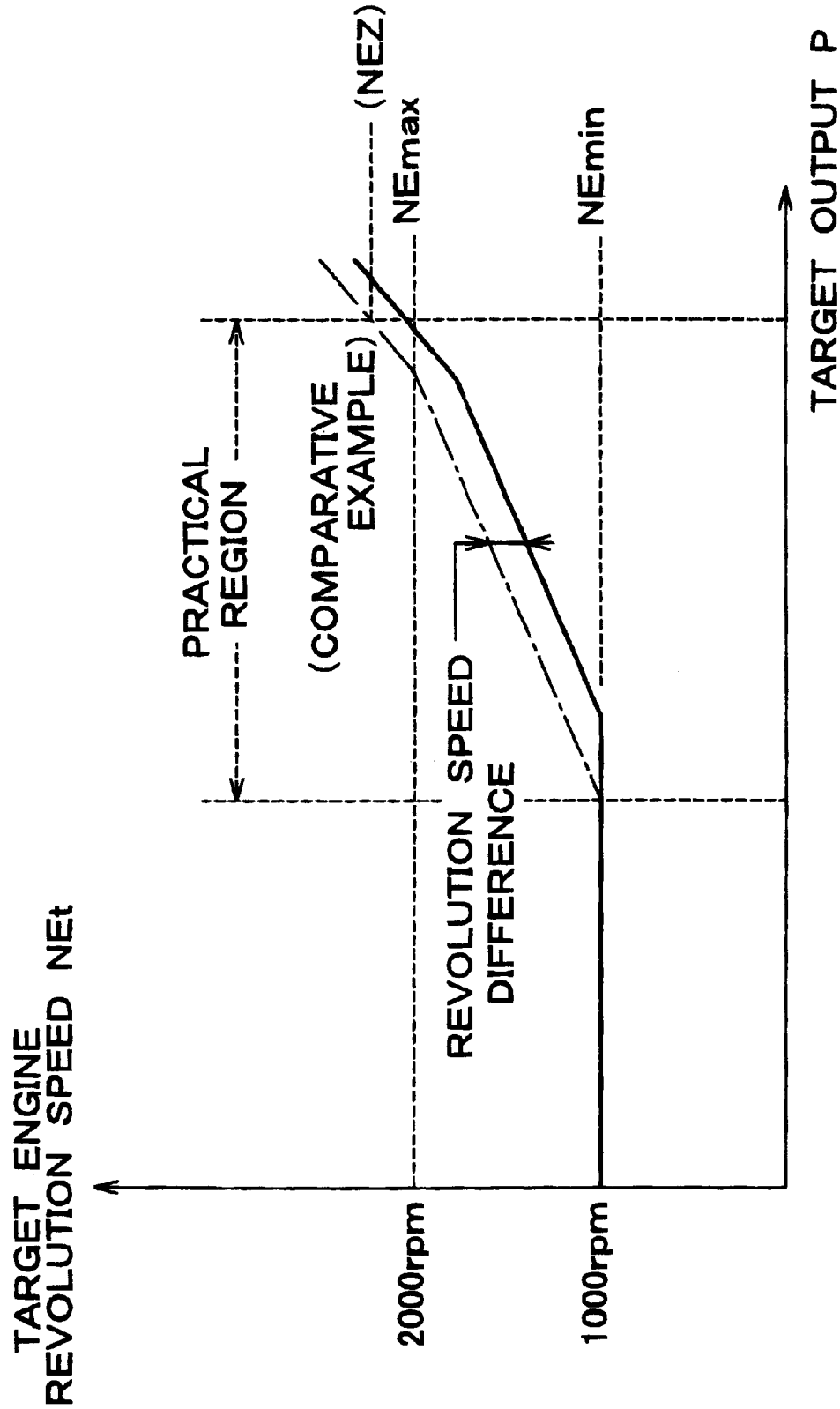
FIG. 11 is a diagram illustrating a one-dimensional map for calculating the target engine revolution speed NEt from the target output P, which is provided for realizing the speed shift line CV shown in FIG. 9.

In the block B3, a target engine revolution speed NEt is calculated from the target output P, with reference to a one-dimensional map as indicated by a solid line in FIG. 11 which is pre-stored in the ROM 66b of the T-ECU 66. If a speed shift line CV is set in a two-dimensional space of the engine revolution speed NE and the engine torque T as indicated in FIG. 9, an engine revolution speed NE can be independently determined in accordance with the output. Therefore, a one-dimensional map for determining the target engine revolution speed NEt by using the target output P as a parameter as indicated by the solid line in FIG. 11 can be set from the speed shift line CV shown in FIG. 9.

Then, the speed shift control of the CVT 64 is performed so that the present actual engine revolution speed NE becomes equal to the target engine revolution speed NEt (B4).

It is to be noted herein that the engine revolution speed NE and the primary pulley rotation speed NP have a relationship of equivalence. Therefore, in the aforementioned speed shift control of the CVT 64, the CVT 64 can be controlled by using the primary pulley rotation speed NP instead of the engine revolution speed NE. The blocks B3, B4 are processes performed by the T-ECU 66. In reality, therefore, the T-ECU 66 may control the CVT 64 by handling the target primary pulley rotation speed NPt for the target engine revolution speed NEt, and handling the actual primary pulley rotation speed NP for the actual engine revolution speed NE.

In a flow different from the above-described flow, a target engine torque T0 is calculated from the target output P calculated in the block B2 (B5).

More specifically, the target engine torque T0 is calculated by dividing the target output P by the present actual engine revolution speed NE as in Equation (2).

It is also practicable to substitute the actual engine revolution speed NE with the actual primary pulley rotation speed NP in calculating target engine torque T0. The target engine torque T0 may also be calculated by using the aforementioned target engine revolution speed NEt (target primary pulley rotation speed NPt).

$$T0 \leftarrow 30 \cdot P/(\pi \cdot NE) \qquad (2)$$

The engine torque is controlled so that the actual engine torque reaches the calculated target engine torque T0 (B6). More specifically, the amount of fuel injection and the amount of intake air are adjusted so that the target engine torque T0 is reached. If the present form of combustion is the stratified charge combustion or the weak stratified charge combustion, the engine torque is adjusted based on the amount of fuel injected. If the present form of combustion is the uniform combustion, the engine torque is adjusted based on the amount of intake air, that is, the degree of opening of the throttle valve 46 (degree of throttle opening TA).

Due to the processes as in the blocks B1 to B6, the speed ratio of the CVT 64 is adjusted along the speed shift line CV shown in FIG. 9.

Figure 12:
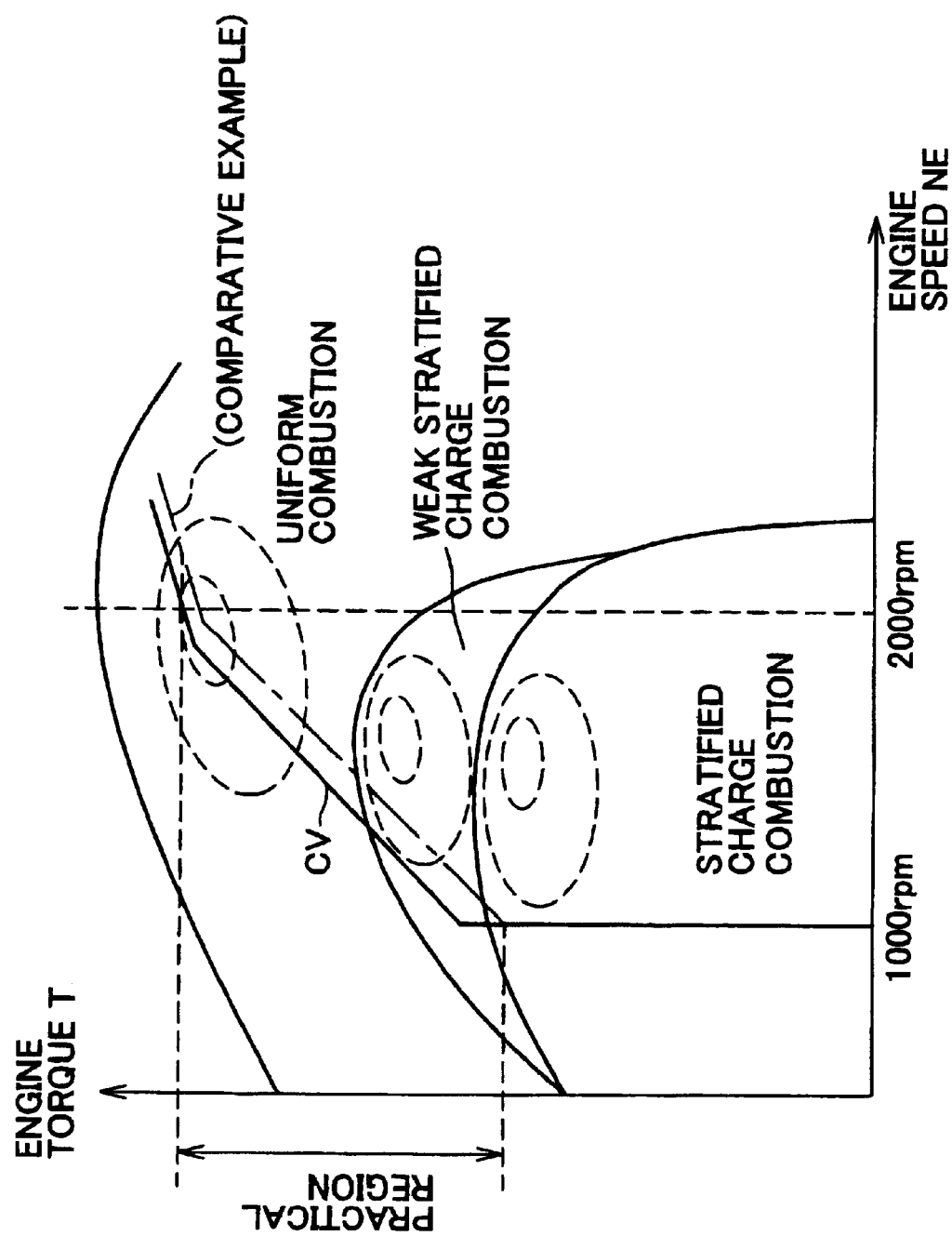
FIG. 12 is a diagram illustrating relationships between fuel consumption rates in the forms of combustion and the speed shift line CV used in Embodiment 1.

Relationships between the speed shift line CV and the fuel consumption rates provided by the forms of combustion is indicated in FIG. 12. In FIG. 12, elliptical broken lines represent constant fuel consumption rate lines. A comparative example indicated by one-dot chain lines in FIGS. 11 and 12 represents a case in which an optimal fuel consumption line determined based on the efficiency of the engine 2 and the efficiency of the CVT 64 is set as a speed shift line. As can be understood from FIGS. 11 and 12, the speed shift line CV of Embodiment 1 is set on a low engine speed side of the optimal fuel consumption line, as far as a practical region is concerned. Furthermore, the speed shift line CV is set so that, within the practical region, the difference between the minimum engine revolution speed NEmin and the maximum engine revolution speed NEmax on the speed shift line CV is smaller than the difference between the minimum engine revolution speed on the optimal fuel consumption line (equal to NEmin) and the maximum engine revolution speed NEZ on the optimal fuel consumption line. Still further, the speed shift line CV is set so that, within the practical region, the sensitivity of revolution speed fluctuation with respect to fluctuation in the target drive power F based on the speed shift line CV is lower than the sensitivity based on optimal fuel consumption line.

In the above-described construction, the processes of the blocks B3, B4 correspond to the operations as a speed ratio control means.

Embodiment 1 constructed as described above achieves the following advantages.

As indicated in FIGS. 11 and 12, the speed ratio of the CVT 64 is controlled in accordance with the speed shift line (solid line) that is set so that, within the practical region, the speed shift line is located on the low engine speed side of the optimal fuel consumption line (one-dot chain line) determined based on the efficiency of the engine 2 and the efficiency of the CVT 64. Therefore, the width of increase in the engine revolution speed from the level at the beginning of the practical region is curbed. Hence, the fuel consumption resulting from inertia torques caused by fluctuations in the revolution speed of the engine 2, that is, revolution speed fluctuations of the input shaft of the CVT 64 and the input shaft of the fluidic power transfer mechanism 62, is reduced, so that the efficiency as a whole increases and the fuel economy improves in comparison with the case where the optimal fuel consumption line is used as a control basis.

Furthermore, within the practical region, the difference between the maximum engine revolution speed NEmax and the minimum engine revolution speed NEmin on the speed shift line is smaller than the difference between the maximum engine revolution speed NEZ and the minimum engine revolution speed (equal to NEmin) on the optimal fuel consumption line. Therefore, great fluctuations in the engine revolution speed NE of the engine 2 are substantially prevented even if the target drive power F fluctuates in the practical region. Hence, the fuel consumption resulting from inertia torques caused by fluctuations in the revolution speed of the engine 2, that is, revolution speed fluctuations of the input shaft of the CVT 64 and the input shaft of the fluidic power transfer mechanism 62, is reduced, so that the efficiency as a whole increases and the fuel economy improves in comparison with the case where the optimal fuel consumption line is used as a control basis.

Furthermore, in the practical region, the speed shift line is set so that the rising of target engine revolution speed NEt is delayed with respect to the rising of the target output P of the engine 2. That is, the speed shift line is set so that, in the practical region, the sensitivity of fluctuation in engine revolution speed with respect to fluctuation in the target drive power F based on the speed shift line is lower than the sensitivity based on the optimal fuel consumption line. Therefore, great fluctuations in the engine revolution speed NE are prevented even if the target drive power F fluctuates in the practical region. Hence, the fuel consumption resulting from inertia torques caused by fluctuations in the revolution speed of the engine 2, that is, revolution speed fluctuations of the input shaft of the CVT 64 and the input shaft of the fluidic power transfer mechanism 62, is reduced, so that the efficiency as a whole increases and the fuel economy improves in comparison with the case where the optimal fuel consumption line is used as a control basis.

The speed shift line CV in Embodiment 1 is set so as to define a relationship in which in all the forms of combustion, as the engine torque T increases, the engine revolution speed NE remains constant or increases. Therefore, even in a portion of the practical region, a great fluctuation in the engine speed in response to a small fluctuation in the target drive power F is prevented, so that the aforementioned fuel efficiency improvement becomes more remarkable.

Embodiment 2 of the invention will next be described.

In Embodiment 2, a NOx storage-reduction type catalyst 99 is incorporated in a catalytic converter 49 shown in FIG. 2, which shows Embodiment 1. The E-ECU 60 performs a rich spike control by performing a fuel injection amount control process illustrated in the flowchart of FIG. 13 and a process of setting a rich spike execution flag Fnox illustrated in the flowchart of FIG. 14. In conjunction with the rich spike control, a speed shift line CV is set as indicted in FIG. 15. Other constructions of Embodiment 2 are substantially the same as those of Embodiment 1. In the following description, the hardware construction of Embodiment 2 should be apparent from the aforementioned drawings of Embodiment 1 and the reference characters representing the component parts and the like.

Figure 13:
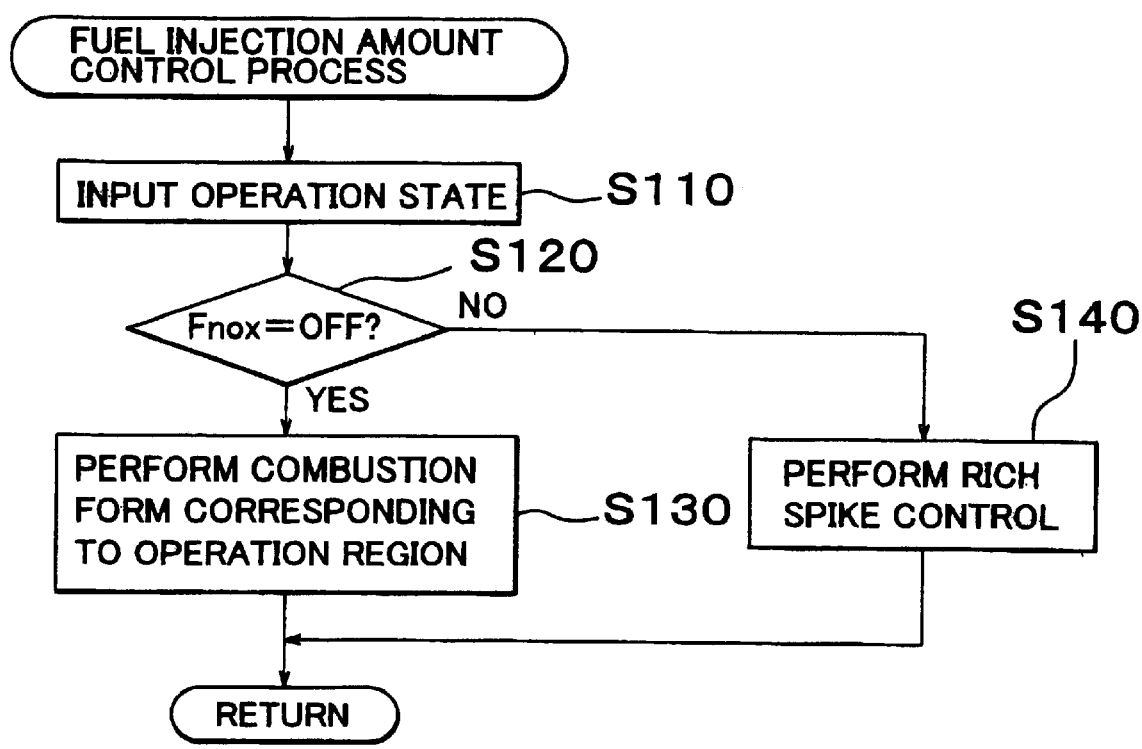
FIG. 13 is a flowchart illustrating a fuel injection amount control process executed by the E-ECU in Embodiment 2.

The fuel injection amount control process will be described with reference to FIG. 13. This process is cyclically executed by every pre-set crank angle.

When fuel injection amount control process starts, the E-ECU 60 inputs various engine operation state data, such as the accelerator operation amount ACCP, the engine revolution speed NE, the intake pressure PM, the cooling water temperature THW, the air-fuel ratio A/F, etc., into work areas in the RAM 60c (S110).

Subsequently, the E-ECU 60 determines whether the rich spike execution flag Fnox is "OFF" (S120). If Fnox="OFF" ("YES" in S120), the E-ECU 60 selects and executes a form of combustion in accordance with the operation state, that is, one of the stratified charge combustion, the uniform combustion and the weak stratified charge combustion, as described above in conjunction with Embodiment 1 (S130). Then, the E-ECU 60 temporarily ends the process.

Conversely, if Fnox="ON" ("NO" in S120), the E-ECU 60 performs the rich spike control (S140). More specifically, the E-ECU 60 performs a process of shifting the air-fuel ratio A/F to the rich side (e.g., A/F=11.5) by temporarily increasing the amount of fuel injected from the fuel injection valves 22. When the rich spike control process is performed in this manner, unburned gas is produced in exhaust, and is supplied as a reducing agent to the catalytic converter 49, so that NOx in the NOx storage-reduction type catalyst 99 is reduced.

After that, the E-ECU 60 temporarily ends the process.

Figure 14:
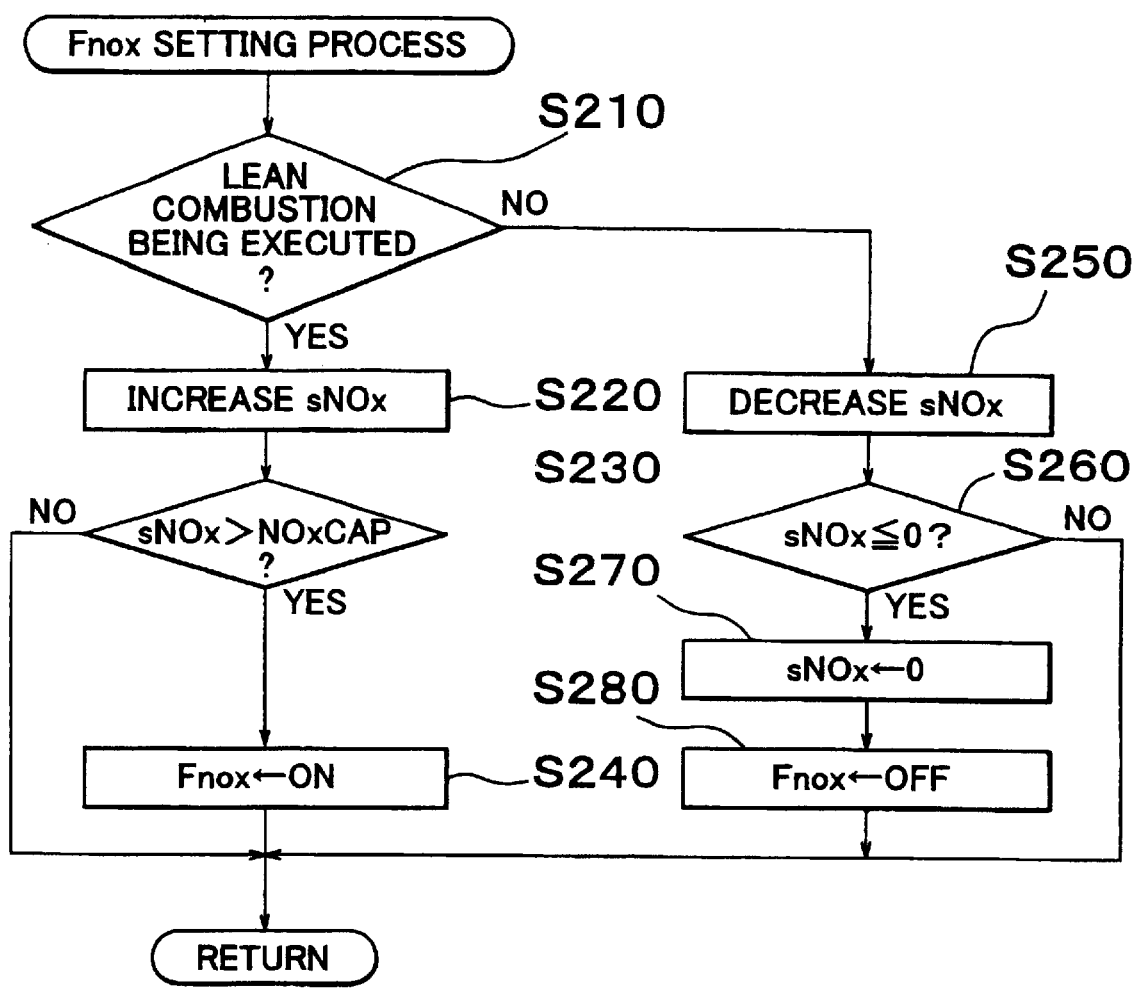
FIG. 14 is a flowchart illustrating a rich spike execution flag Fnox setting process executed by E-ECU in Embodiment 2.

The rich spike execution flag Fnox setting process will be described with reference to the flowchart of FIG. 14. The rich spike execution flag Fnox setting process is cyclically executed at every pre-set crank angle.

First, the E-ECU 60 determines whether the lean combustion (the stratified charge combustion or the weak stratified charge combustion) is being performed (S210). If the lean combustion is being performed ("YES" in S210), the E-ECU 60 calculates an added amount of NOx that is produced by the lean combustion and is stored into the NOx storage-reduction type catalyst 99, based on the relationship between the intake pressure PM and the amount of fuel injected from each fuel injection valve 22 by the fuel injection amount control process. The E-ECU 60 then increases the amount of NOx stored sNOx calculated in the previous control cycle by the added amount of NOx to determine a new amount of NOx stored sNOx (S220).

Subsequently, the E-ECU 60 determines whether the amount of NOx stored sNOx has exceeded an allowable storage value NOxCAP (S230). If sNOx≦NOxCAP ("NO" in S230), the E-ECU 60 temporarily ends the process without performing any further processing.

If sNOx>NOxCAP ("YES" in S230), the E-ECU 60 subsequently sets "ON" in the rich spike execution flag Fnox (S240). Then, the E-ECU 60 temporarily ends the process.

When the uniform combustion is being executed instead of the lean combustion ("NO" in S210), the E-ECU 60 calculates an amount of NOx that is reduced by unburned gas after being stored in the NOx storage-reduction type catalyst 99, based on the relationship between the intake pressure PM and the amount of fuel injected from each fuel injection valve 22 by the fuel injection amount control process. The E-ECU 60 then decreases the amount of NOx stored sNOx calculated during the previous control cycle by the amount of NOx reduced, thereby determining a new amount of NOx stored sNOx (S250).

Subsequently, the E-ECU 60 determines whether the amount of NOx stored sNOx is at most "0" (S260). If sNOx≦0 ("YES" in S260), the E-ECU 60 sets "0" as the amount of NOx stored sNOx (S270), and then sets "OFF" in the rich spike execution flag Fnox (S280). Subsequently, the E-ECU 60 temporarily ends the process. If sNOx>0 ("NO" in S260), the E-ECU 60 temporarily ends the process without performing any further processing.

Considering the rich spike control performed during the stratified charge combustion and during the weak stratified charge combustion, it can be understood that the fuel economy slightly deteriorates during the stratified charge combustion and the weak stratified charge combustion with the rich spike control in comparison with a case where the stratified charge combustion and the weak stratified charge combustion are simply performed without the rich spike control.

Figure 16:
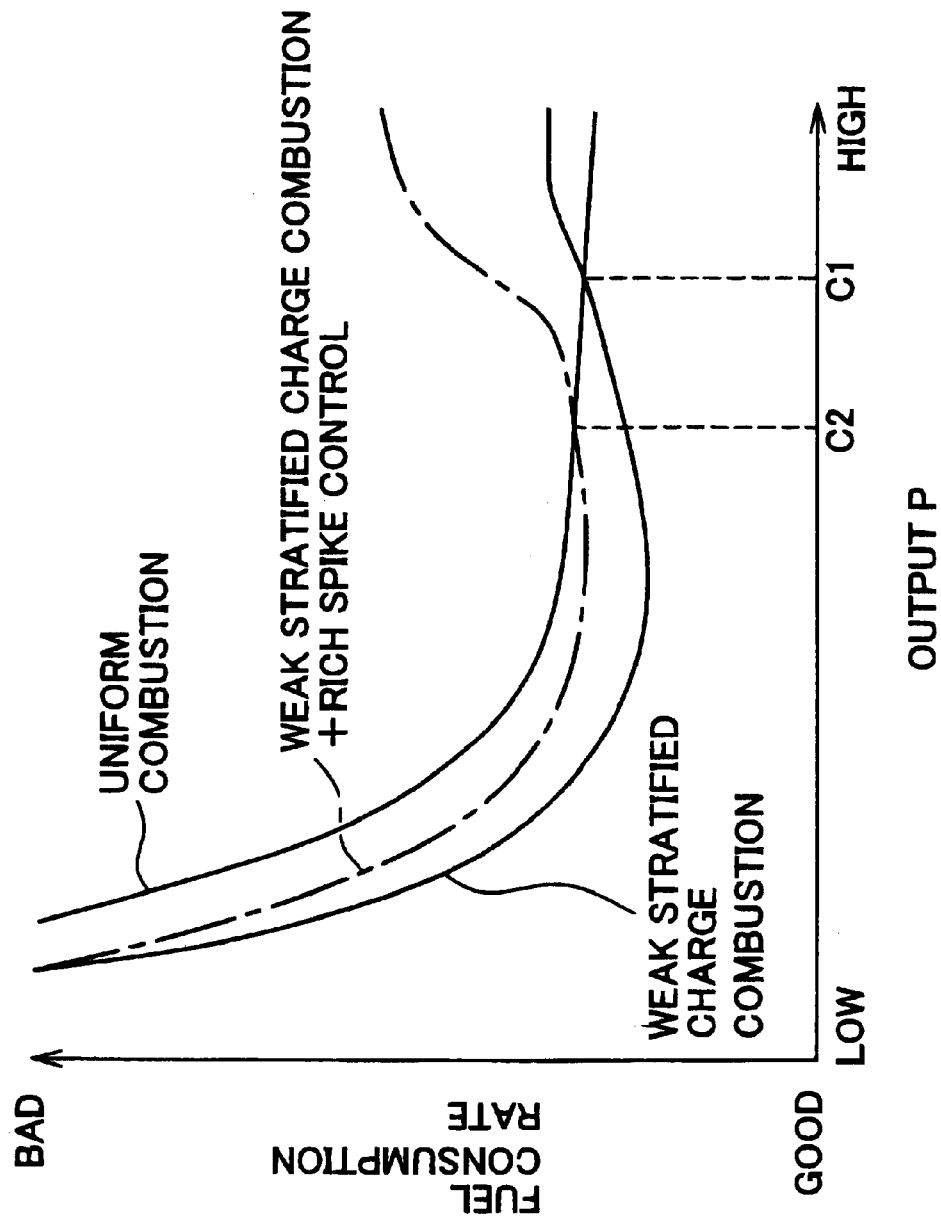
FIG. 16 is a graph indicating changes in the fuel consumption rate caused by a rich spike control in Embodiment 2.

Therefore, as indicated in FIG. 16 illustrating relationships between the fuel consumption rate and the output with the engine revolution speed NE being fixed, the point of equality C2 between the fuel consumption rate in the uniform combustion and the fuel consumption rate in the weak stratified charge combustion with the rich spike control is shifted to the low output side of the point of equality C1 between the fuel consumption rate in the uniform combustion and the fuel consumption rate in the weak stratified charge combustion without the rich spike control.

Figure 15:
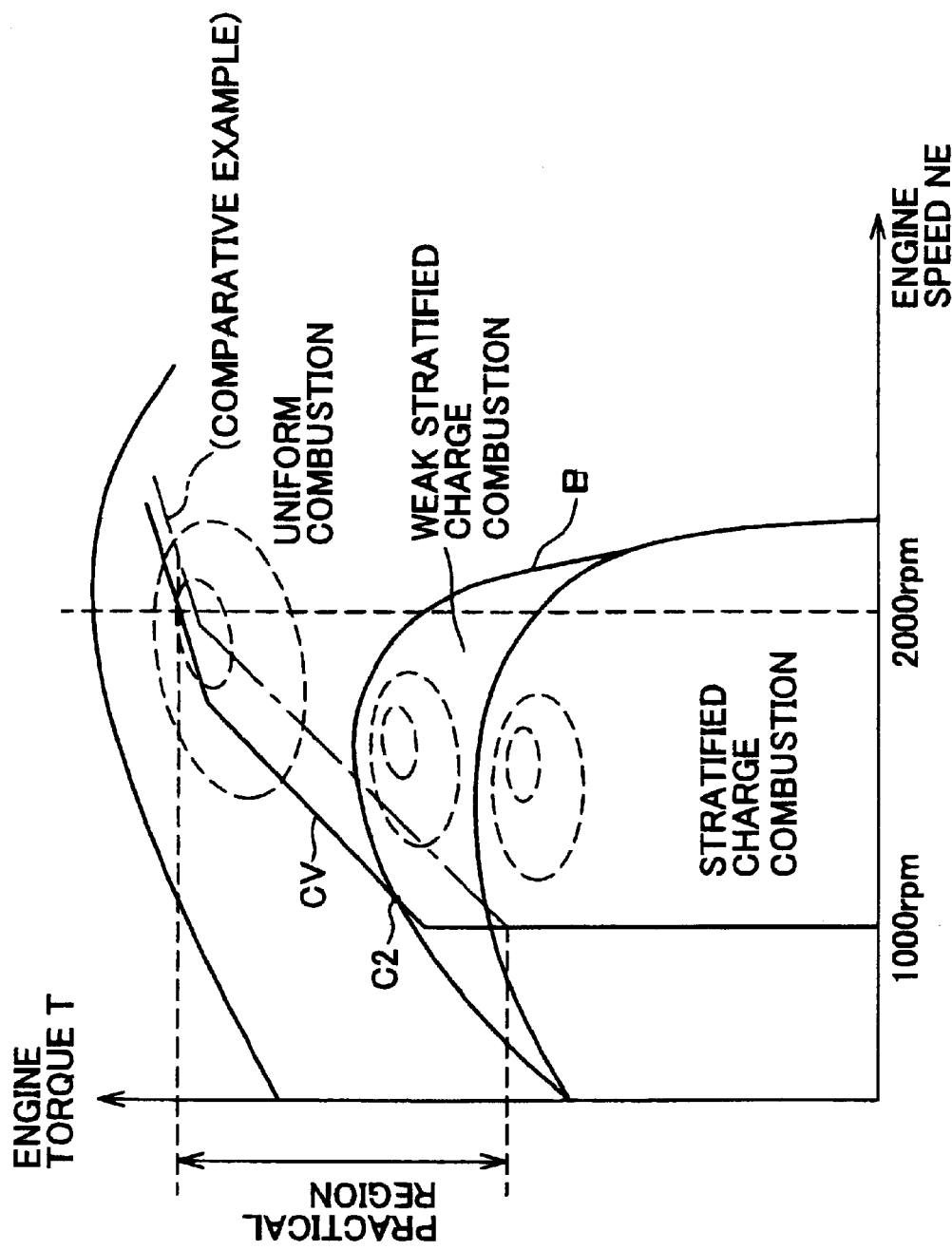
FIG. 15 is a diagram illustrating the construction of a speed shift line CV used in Embodiment 2.

In Embodiment 2, the speed shift line CV is set so that, within the practical region, the speed shift line CV is located on the low engine speed side of the optimal fuel consumption line determined based on the efficiency of the engine 2 and the efficiency of the CVT 64. As indicated in FIG. 15, the speed shift line CV is set in the aforementioned setting so as to pass through the point of equality C2 of fuel consumption rate on a boundary line B between the uniform combustion and the weak stratified charge combustion.

If an appropriate point of equality C2 does not exist on the boundary line B between the uniform combustion and the weak stratified charge combustion in the low engine speed side of the optimal fuel consumption line, a speed shift line CV is set so as to pass through a point at which the fuel consumption rate in the uniform combustion and the fuel consumption rate in the weak stratified charge combustion are closest to each other, or is set so as to cross on the boundary line B between the uniform combustion and the weak stratified charge combustion, in the vicinity of the point of equality C2 or in the vicinity of the point of greatest proximity.

Embodiment 2, constructed as described above, achieves substantially the same advantages as those of Embodiment 1.

The point which exists on the boundary line B between the stratified charge combustion and the uniform combustion and through which the speed shift line CV passes is set to a point of equality or greatest proximity between the fuel consumption rate in the uniform combustion and the corrected fuel consumption rate determined by taking into account the rich spike control as well as the fuel consumption rate in the weak stratified charge combustion, or is set in the vicinity of the point of equality or greatest proximity.

More specifically, as indicated in FIG. 16, a fuel consumption rate line with good fuel consumption rate can be obtained by setting the speed shift line CV so as to extend through the point C2 in a region where the form of combustion is switched from the stratified charge combustion to the uniform combustion. Therefore, it becomes possible to change the speed ratio while always maintaining good fuel consumption rate. As a result, fuel economy can be improved.

Figure 17:
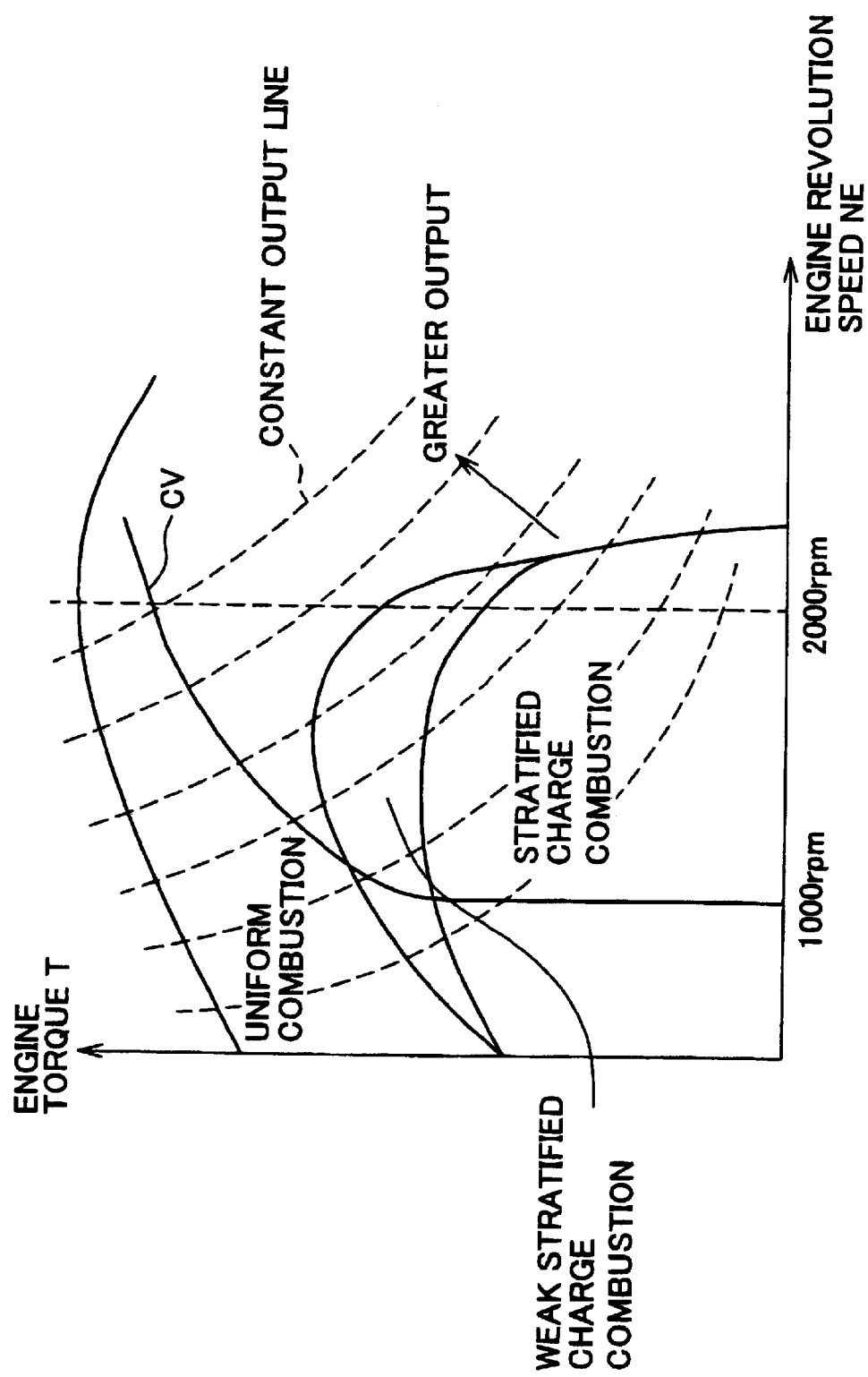
FIG. 17 is a diagram illustrating the construction of a speed shift line CV in another embodiment of the invention.

Although in the foregoing embodiments, the speed shift line CV is a sharply bent line, the speed shift line CV may also be a line that curves and extends toward the low engine speed side in the practical region. See, e.g., FIG. 17.

Although in the foregoing embodiments, the CVT 64 is a belt type continuously variable transmission, the CVT 64 may also be a toroidal type continuously variable transmission or the like.

In the foregoing embodiments, the lean combustion is performed in the form of the stratified charge combustion or the weak stratified charge combustion. However, the lean combustion may also be performed in other forms, for example, in the form of generally termed "lean burn", that is, a uniform lean combustion in which fuel is uniformly mixed with intake air at a ratio that is on the lean side of the stoichiometric air-fuel ratio and such a uniform mixture is ignited.

Figure 18:
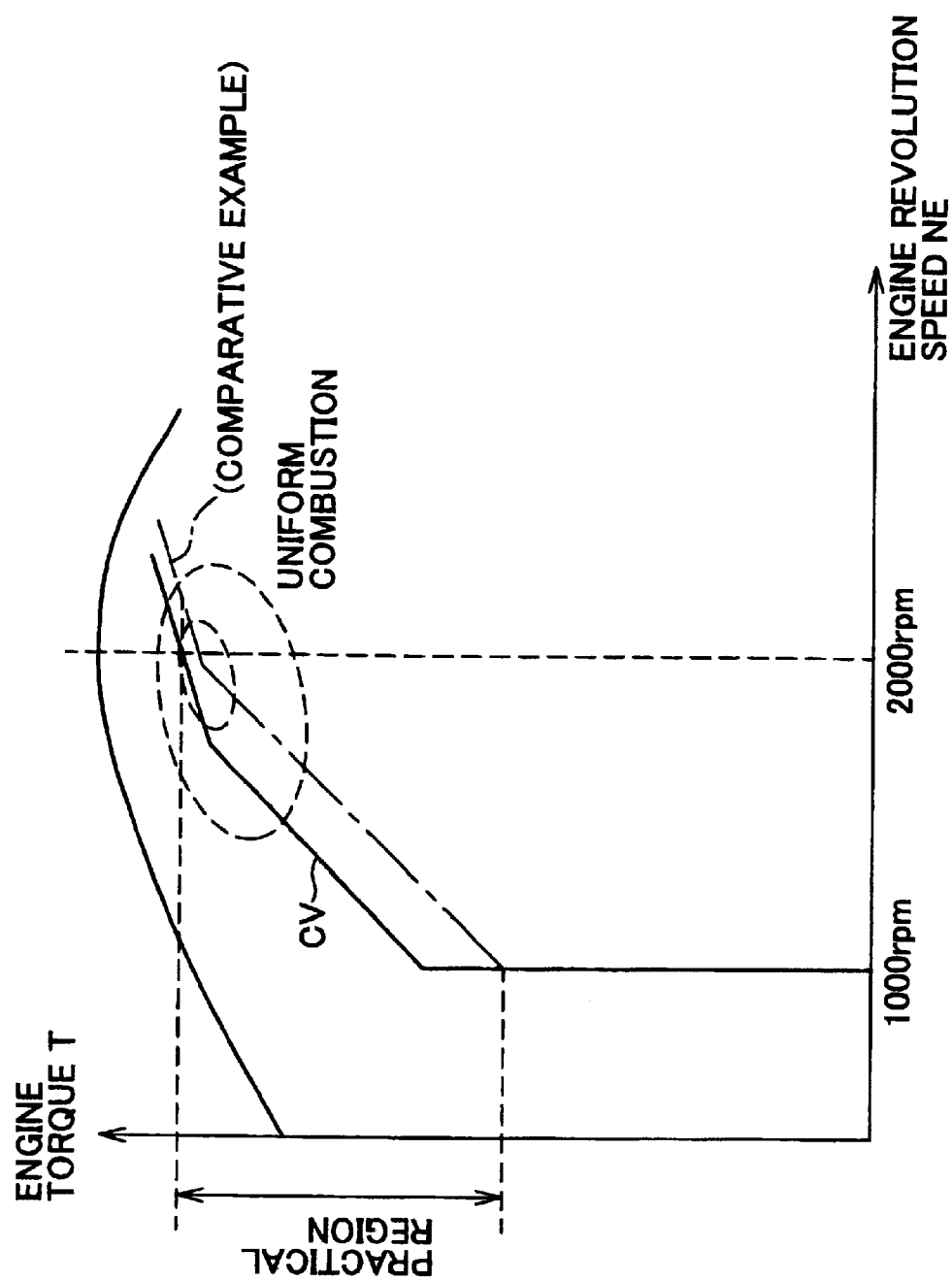
FIG. 18 is a diagram illustrating the construction of a speed shift line CV in still another embodiment of the invention.
Figure 19:
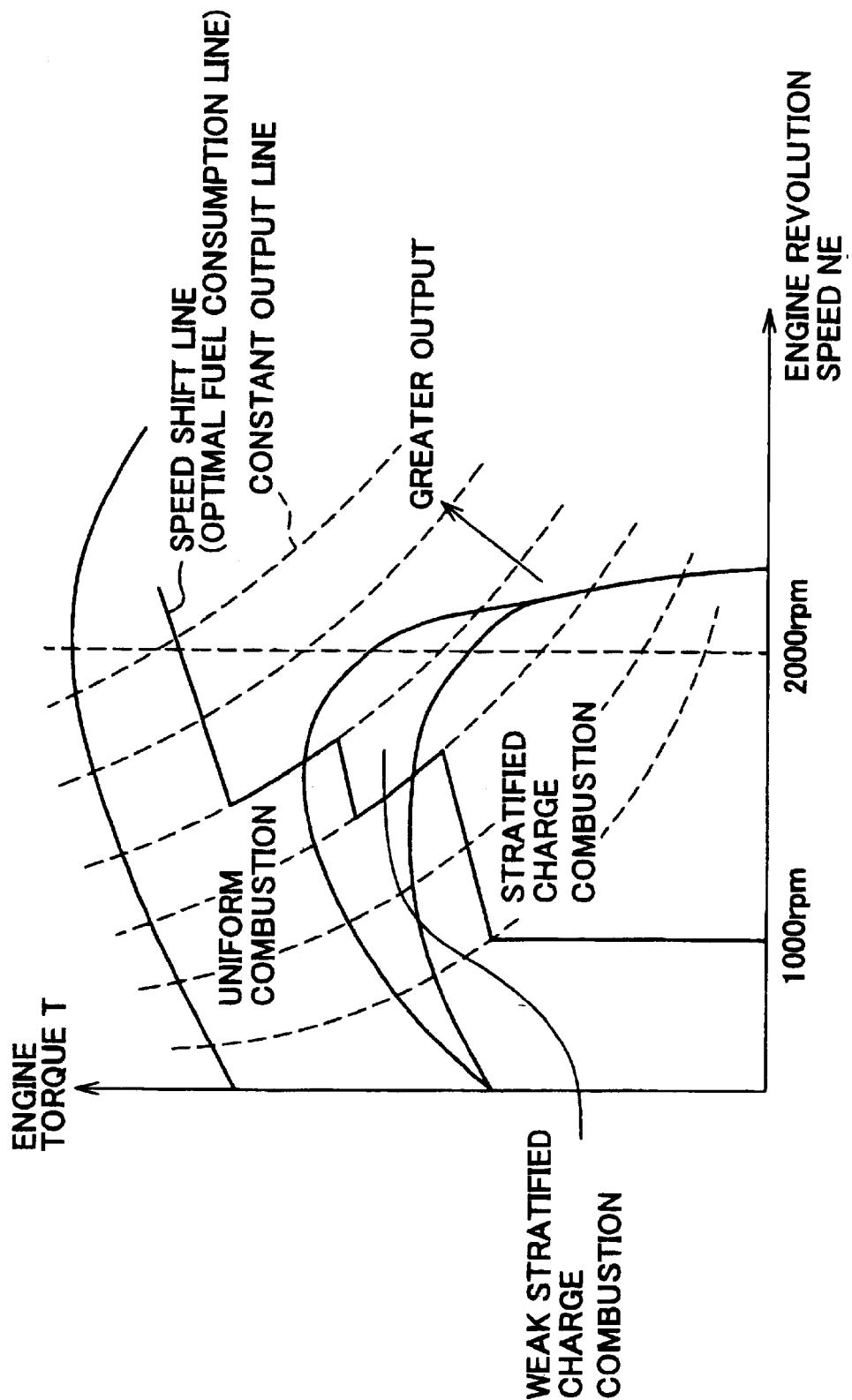
FIG. 19 is a diagram illustrating the construction of a conventional speed shift line.

In the foregoing embodiments, the speed shift line CV is a speed shift line CV for a motor vehicle in which a direct injection type gasoline engine is installed and the form of combustion in the engine is changed. The speed shift line CV in the invention is also applicable to a speed shift line CV for a motor vehicle in which an intake port injection type engine is installed and the possible form of combustion is only the uniform combustion at the stoichiometric air-fuel ratio as indicated in FIG. 18. In the case where the form of combustion is fixed, too, engine revolution speed fluctuation is reduced, so that the fuel consumption caused by inertia torques is reduced. As a result, the efficiency as a whole increases and fuel economy improves in comparison with the case where the optimal fuel consumption rate line is used as a control basis.

While the embodiments of the invention have been described, the invention further includes, for example, the following embodiments.

In a vehicle that is driven by output of an internal combustion engine via a continuously variable transmission, a vehicle drive power control apparatus which determines a target drive power based on a state of operation of the vehicle, and which controls the torque of the engine and the speed ratio of the continuously variable transmission so as to provide an output of the engine for achieving the target drive power, the drive power control apparatus including a controller that controls the speed ratio of the continuously variable transmission in accordance with a speed shift line that is set in a two-dimensional space of the revolution speed of the engine and the torque of the engine. The speed is possible to set in the following way.

The speed shift line is, with a practical region, at a low revolution speed side of an optimal fuel consumption line that is determined based on an efficiency of the entire drive system that includes the engine and the continuously variable transmission.

The difference between the minimum revolution speed and the maximum revolution speed on the speed shift line is, with a practical region, smaller than the difference between the minimum revolution speed and the maximum revolution speed on an optimal fuel consumption rate line that is determined based on the efficiency of the entire drive system that includes the engine and the continuously variable transmission.

The sensitivity of revolution speed fluctuation with respect to fluctuation in the target drive power is, with a practical region, lower on the speed shift line than on an optimal fuel consumption line determined based on the efficiency of the entire drive system that includes the engine and the continuously variable transmission.

In the illustrated embodiment, the T-ECU 66 and the E-ECU 60 are implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A drive power control apparatus of a vehicle, comprising:
   an engine that generates a drive power of the vehicle;
   a transmission that is connected to an output shaft of the engine and that performs a speed shift of the vehicle; and
   a controller that:
   determines a target drive power based on a state of operation of the vehicle;
   controls a torque of the engine and a speed ratio of the transmission so as to achieve the target drive power,
   wherein the controller controls the speed ratio of the transmission based on a speed shift line that is plotted on a graph having a pair of axes defining a revolution speed of the engine and the torque of the engine so that, within a practical region in which the state of operation of the engine is practical, the speed shift line is at a low revolution speed side of an optimal fuel consumption line that is determined based on at least an efficiency of the engine and an efficiency of the transmission, of an efficiency of a drive system that includes the engine and the transmission.

2. A drive power control apparatus according to claim 1, wherein the speed shift line is set so that, within the practical region, a difference between a minimum revolution speed and a maximum revolution speed on the speed shift line is smaller than a difference between a minimum revolution speed and a maximum revolution speed on the optimal fuel consumption line.

3. A drive power control apparatus according to claim 1, wherein the speed shift line is set so that, within the practical region, a sensitivity of a fluctuation in the revolution speed with respect to a fluctuation in the target drive power on the speed shift line is lower than a sensitivity of a fluctuation in the revolution speed with respect to the fluctuation in the target drive power on the optimal fuel consumption line.

4. A drive power control apparatus according to claim 1, wherein the speed shift line is set so that a width of increase in the revolution speed of the engine from a revolution speed occurring at a beginning of the practical region to a relatively high revolution speed is curbed.

5. A drive power control apparatus according to claim 1, wherein the internal combustion engine selectively performs at least one form of combustion in accordance with the state of operation, and the optimal fuel consumption line reflects the efficiency of the engine with respect to the at least one form of combustion.

6. A drive power control apparatus according to claim 5, wherein the at least one form of combustion includes a stoichiometric air-fuel ratio combustion and a lean combustion.

7. A drive power control apparatus according to claim 6, wherein:

the engine comprises a NOx storage-reduction type catalyst in an exhaust system, and during the lean combustion, the engine reduces NOx stored in the NOx storage-reduction type catalyst by performing a rich spike control that temporarily changes an air-fuel mixture so that a fuel concentration in the mixture becomes higher than the fuel concentration corresponding to a stoichiometric air-fuel ratio, and on a boundary line between the lean combustion and the stoichiometric air-fuel ratio combustion in the graph, the speed shift line passes through or near a point at which a corrected fuel consumption rate determined by considering the rich spike control and a fuel consumption rate provided during the lean combustion becomes equal to or closest to a fuel consumption rate provided during the stoichiometric air-fuel ratio combustion.

8. A drive power control apparatus according to claim 1, wherein the speed shift line is set such that as the torque of the engine increases, the revolution speed of the engine remains constant or increases.

9. A drive power control apparatus according to claim 1, wherein the transmission is a continuously variable transmission and the engine is an internal combustion engine.

10. A drive power control apparatus of a vehicle, comprising:

an engine that generates a drive power of the vehicle;

a transmission that is connected to an output shaft of the engine and that performs a speed shift of the vehicle; and a controller that:

calculates a target output of the engine for achieving a target drive power that is set based on a state of operation of the vehicle, and sets a target revolution speed of the internal combustion engine based on a speed shift line that is plotted on a graph having a pair of axes defining a revolution speed of the engine and the target output of the engine so that, within a practical region in which the state of operation of the engine is practical, a width of increase in the revolution speed of the engine to a relatively high revolution speed on the speed shift line is curbed compared with an optimal fuel consumption line determined based on at least an efficiency of the engine and an efficiency of the transmission, of an efficiency of a drive system that includes the engine and the transmission; and controls the speed ratio of the transmission so that an actual revolution speed of the engine becomes equal to the target revolution speed.

11. A drive power control apparatus according to claim 10, wherein the transmission is a continuously variable transmission and the engine is an internal combustion engine.

12. A drive control method for a vehicle that is driven by an output of an engine via a transmission, the method comprising:

calculating a target output of the engine for achieving a target drive power that is set based on a state of operation of the vehicle;

setting a target revolution speed of the engine based on a speed shift line that is plotted on graph having a pair of axes defining speed of the engine and the target output of the engine so that, within a practical region in which the state of operation of the engine is practical, a width of increase in the revolution speed of the engine to a relatively high revolution speed on the speed shift line is curbed compared with an optimal fuel consumption line determined based on at least an efficiency of the engine and an efficiency of the transmission, of an efficiency of a drive system that includes the engine and the transmission; and controlling the speed ratio of the transmission so that an actual revolution speed of the engine becomes equal to the target revolution speed.

13. A control method according to claim 12, wherein the speed shift line is set so that, within the practical region, a difference between a minimum revolution speed and a maximum revolution speed on the speed shift line is smaller than a difference between a minimum revolution speed and a maximum revolution speed on the optimal fuel consumption line.

14. A control method according to claim 12, wherein the speed shift line is set so that, within the practical region, a sensitivity of a fluctuation in the revolution speed with respect to a fluctuation in the target drive power on the speed shift line is lower than a sensitivity of a fluctuation in the revolution speed with respect to the fluctuation in the target drive power on the optimal fuel consumption line.

15. A control method according to claim 12, wherein the speed shift line is set so that within the practical region, the revolution speed on the speed shift line is lower than the revolution speed on the optimal fuel consumption line.

16. A control method according to claim 12, wherein the engine selectively performs at least one form of combustion in accordance with the state of operation, and the optimal fuel consumption line reflects the efficiency of the engine with respect to the at least one of combustion.

17. A control method according to claim 16, wherein the at least one form of combustion includes a stoichiometric air-fuel ratio combustion and a lean combustion.

18. A control method according to claim 17, wherein:

the engine comprises a NOx storage-reduction type catalyst in an exhaust system, and during the lean combustion, the internal combustion engine reduces NOx stored in the NOx storage-reduction type catalyst by performing a rich spike control that temporarily changes an air-fuel mixture so that a fuel concentration in the mixture becomes higher than the fuel concentration corresponding to a stoichiometric air-fuel ratio, and on a boundary line between the lean combustion and the stoichiometric air-fuel ratio combustion in the graph, the speed shift line passes through or near a point at which a corrected fuel consumption rate determined by considering the rich spike control and a fuel consumption rate provided during the lean combustion becomes equal to or closest to a fuel consumption rate provided during the stoichiometric air-fuel ratio combustion.

19. A control method according to claim 12, wherein the transmission is a continuously variable transmission and the engine is an internal combustion engine.

* * * * *